United States Patent [19]

McDonald et al.

[11] 4,320,282
[45] Mar. 16, 1982

[54] MICROPROCESSOR BASED ARC-AIR AND WELDER NOISE ABATEMENT CONTROLLER

[75] Inventors: John F. McDonald, Clifton Park; Henry A. Scarton, Troy, both of N.Y.; Warren C. Kennedy, Pittsburgh, Pa.; Paul B. Crilly, Ft. Collins, Colo.

[73] Assignee: Rensselaer Polytechnic Institute, Troy, N.Y.

[21] Appl. No.: 121,887

[22] Filed: Feb. 15, 1980

[51] Int. Cl.³ .............................................. B23K 9/06
[52] U.S. Cl. ........................ 219/137 PS; 219/130.33; 219/130.4
[58] Field of Search .......... 219/137 PS, 130.1, 130.21, 219/130.31, 130.32, 130.33, 130.4

[56] References Cited

U.S. PATENT DOCUMENTS

| | | | |
|---|---|---|---|
| 3,904,846 | 12/1973 | Risberg | 219/137 PS |
| 4,117,303 | 9/1978 | Hedberg | 219/130.21 |
| 4,201,906 | 5/1980 | Puschner | 219/137 PS |

*Primary Examiner*—C. C. Shaw
*Attorney, Agent, or Firm*—McGlew and Tuttle

[57] ABSTRACT

Sudden changes in arc current are slowed to mitigate the resulting noise. A sensor detects large decreases in current during initial stages of arc quench and actuate circuits to maintain ionization and current flow to avoid sharp final drop that causes loud noise impulse. Ionization can be maintained by supplying RF energy at appropriate frequency to the arc electrodes and/or by increasing the arc voltage. The sophisticated control algorithm is implemented utilizing an inexpensive microprocessor to exert proper control of arc sustaining parameters to mitigate arc quenching impulse noise.

15 Claims, 35 Drawing Figures

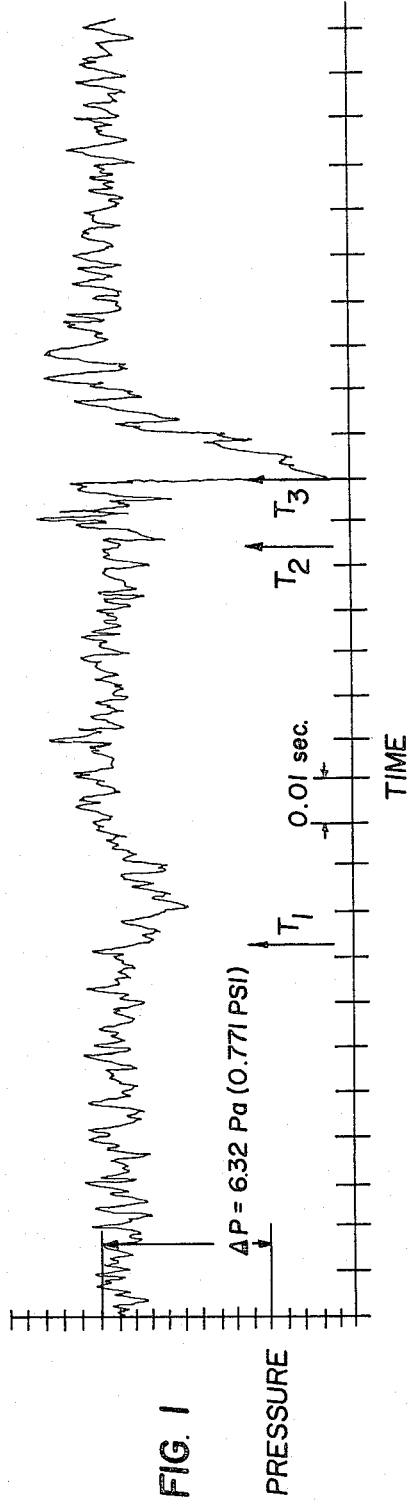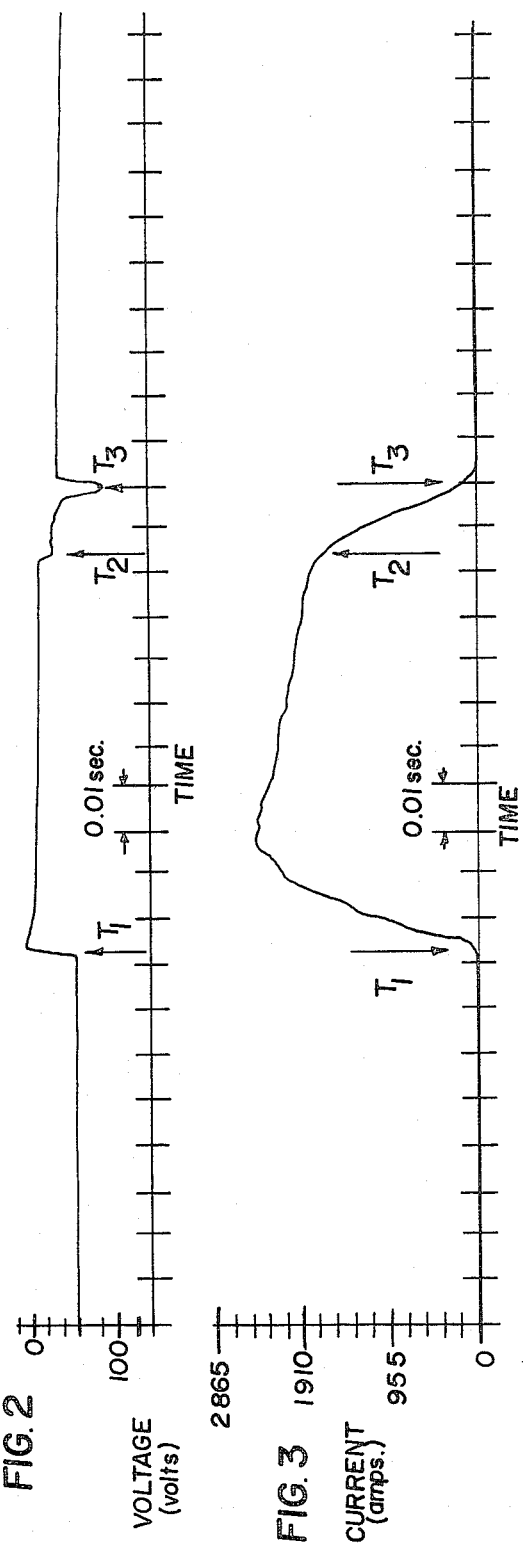

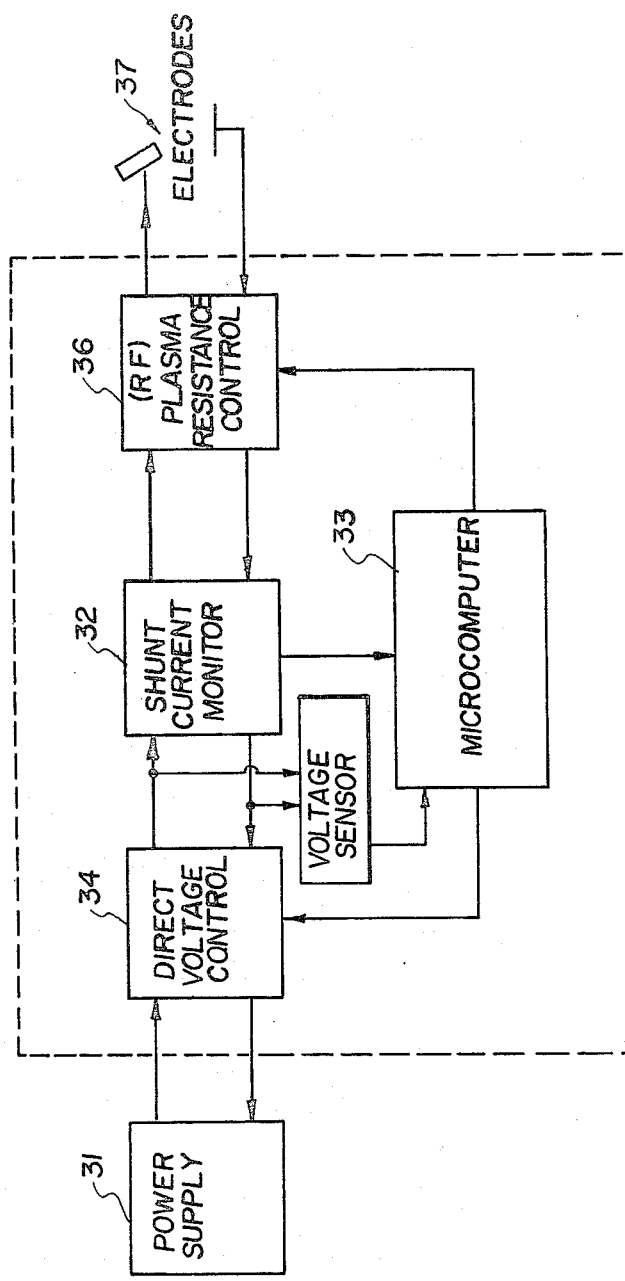

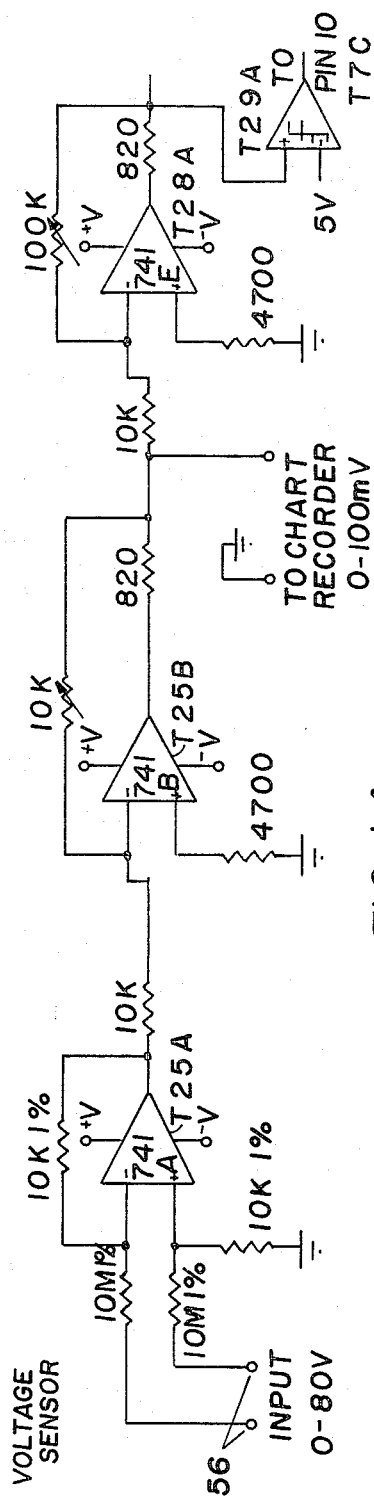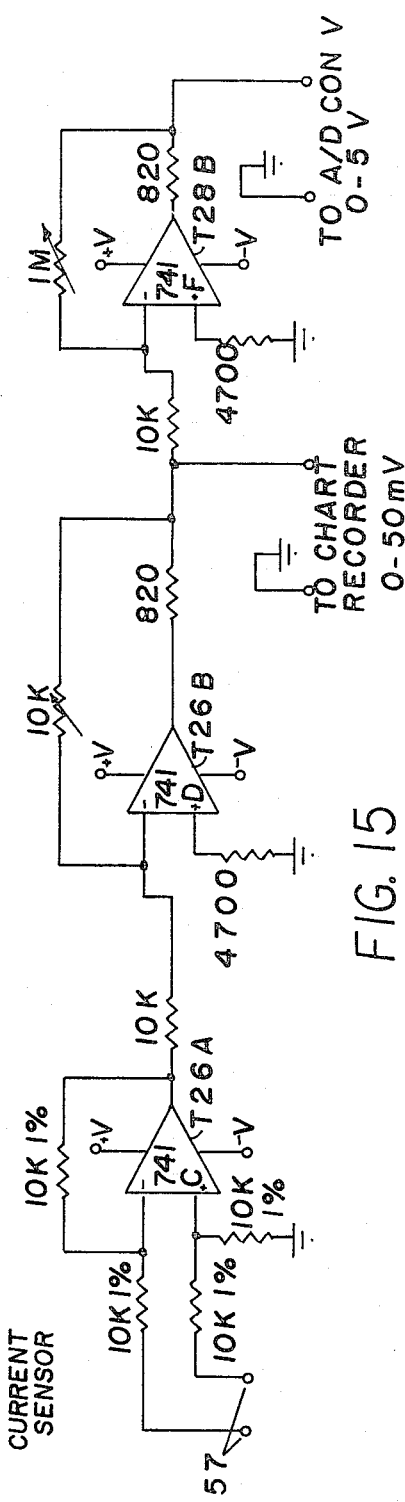
FIG. 14
FIG. 15

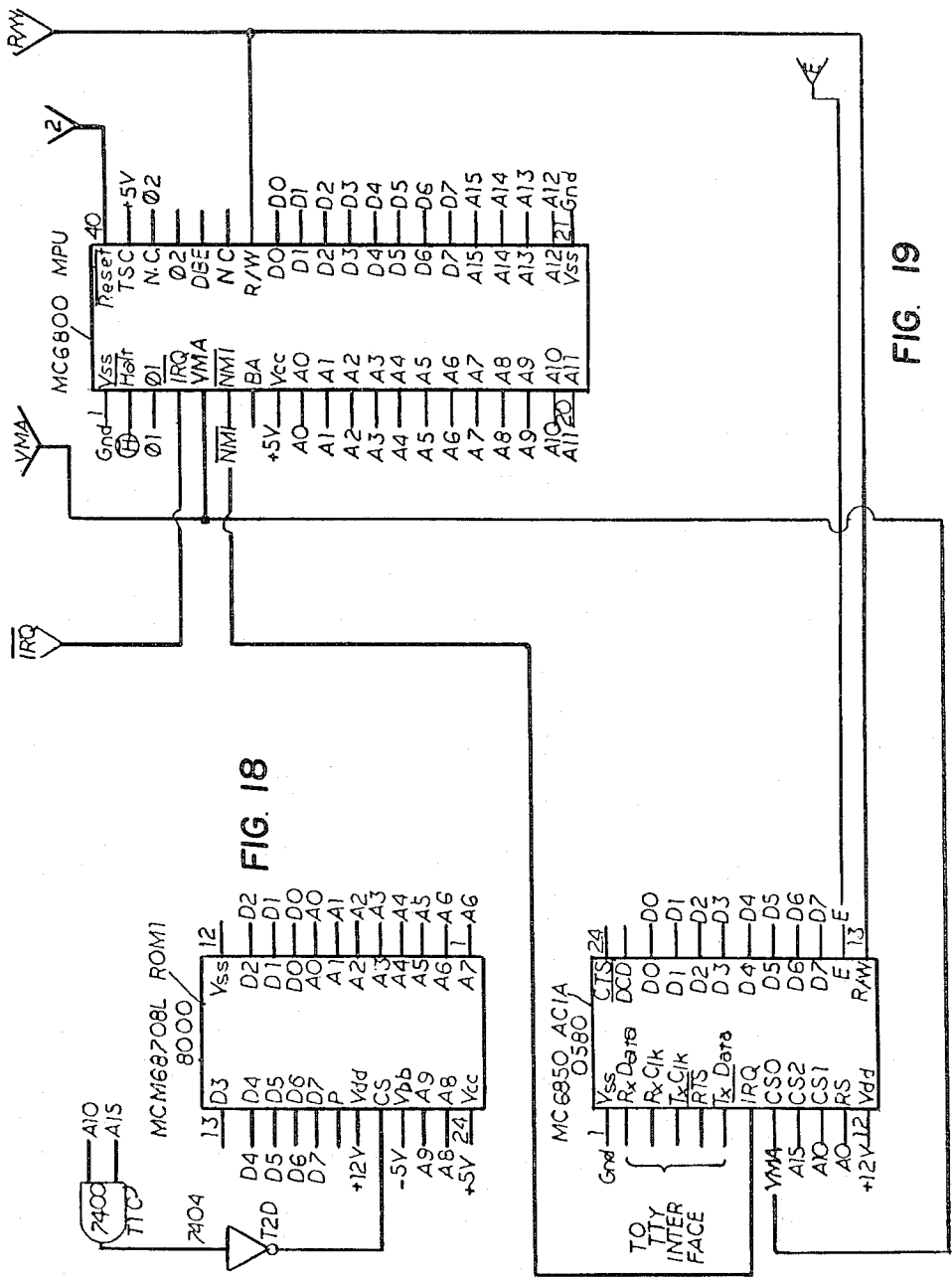

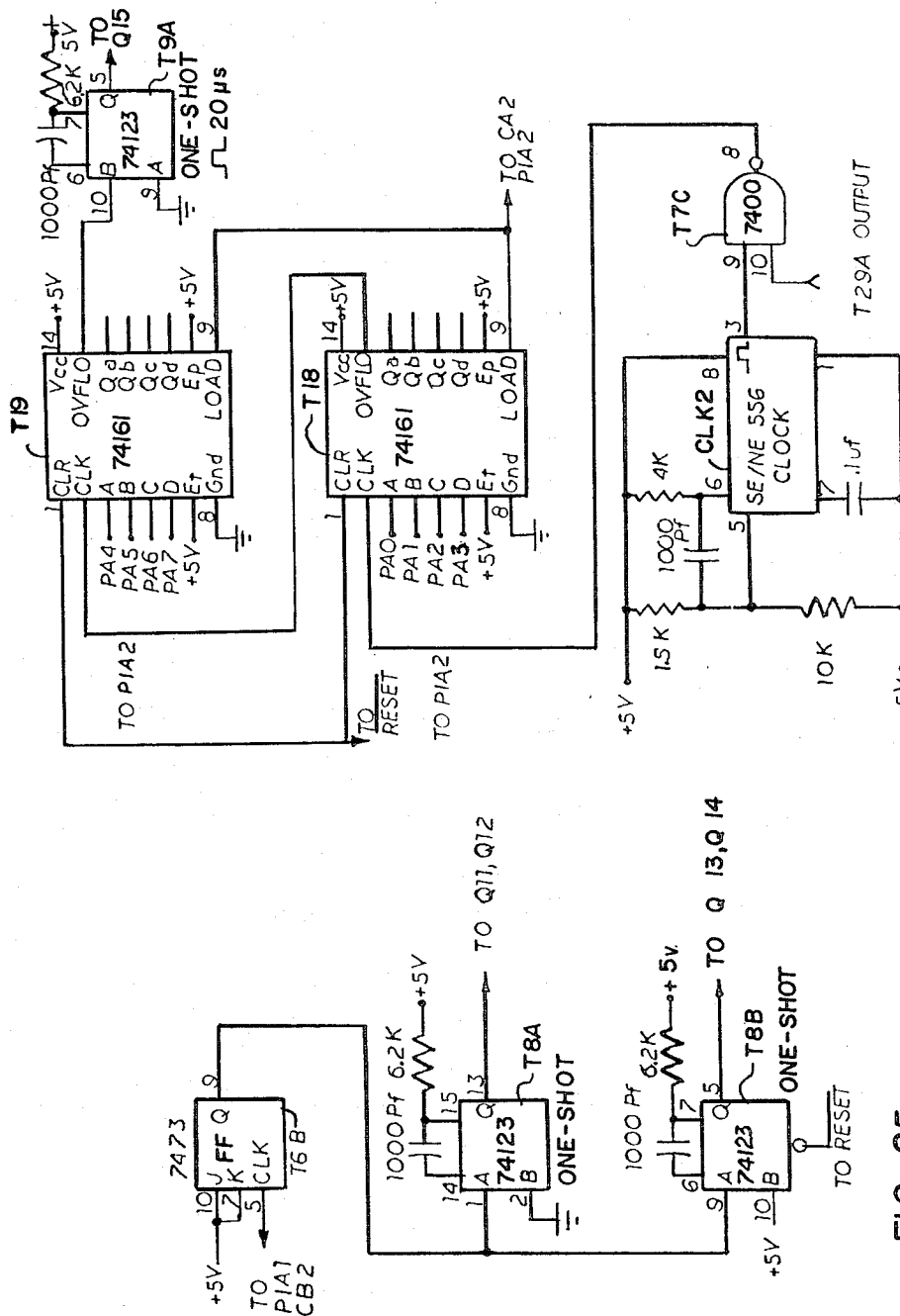

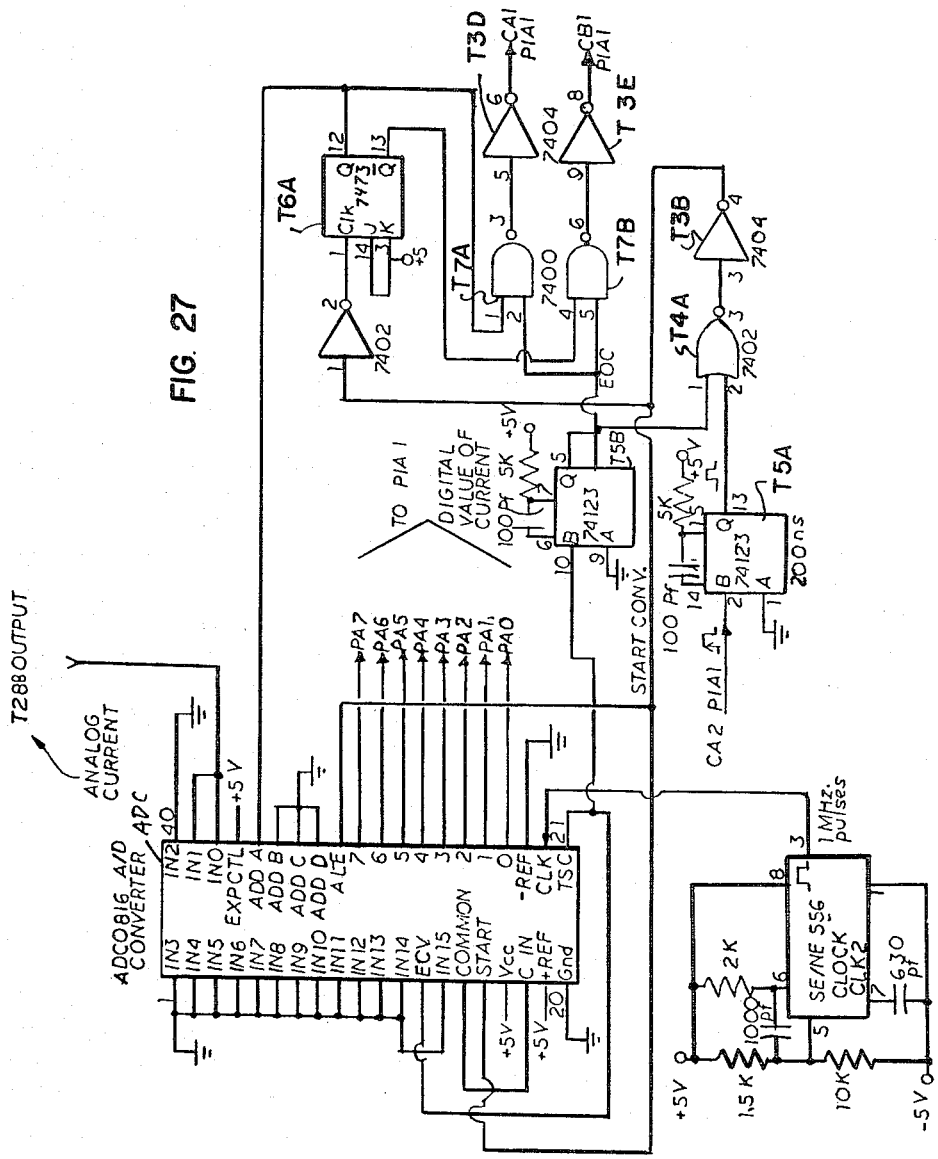

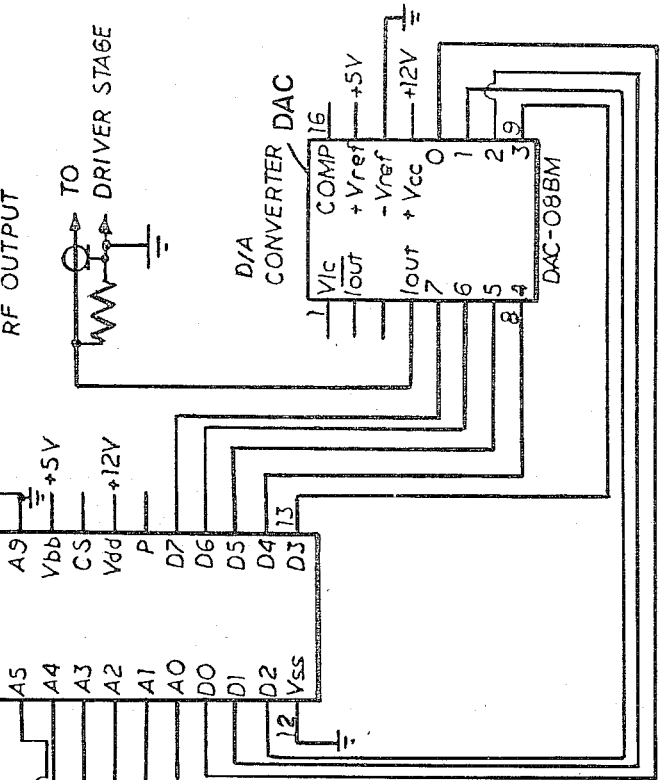
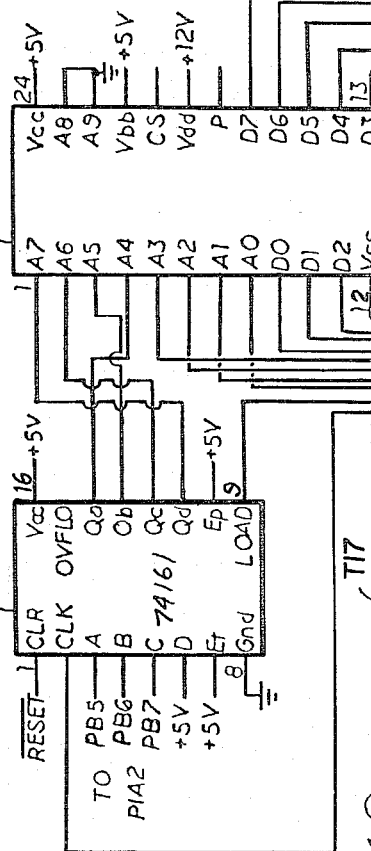
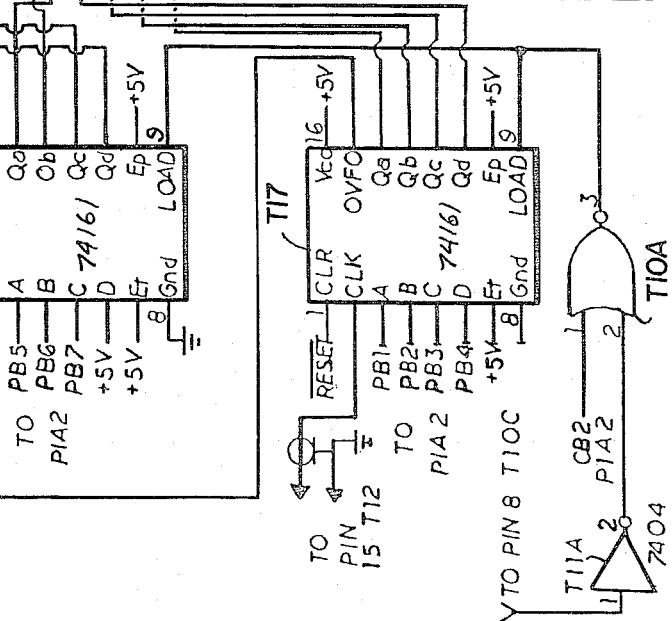
FIG. 28

MICROPROCESSOR BASED ARC-AIR AND WELDER NOISE ABATEMENT CONTROLLER

FIELD AND BACKGROUND OF THE INVENTION

A serious problem in the use of high power electric arc etching tools or high current welders is that they tend to produce acoustic noise impulses of such high amplitude as to cause deafness in the operator of the equipment if the operator is exposed to such noise over long periods of time. The noise is caused by a sudden change in the electric current conditions of the plasma gas between the welding electrodes. When current is flowing steadily between the electrodes in normal welding operation, a force called the Lorentz force is produced that tends to constrict the plasma gas to a certain volume. When the current is turned off deliberately or when it is inadvertently interrupted, the Lorentz force disappears and the heated plasma gas is suddenly able to expand in volume. This sudden expansion constitutes the beginning of a shock wave whose outward propagation is registered in the ear of the operator or anyone else in the vicinity of the arc, as a loud impulse noise. During ignition of the arc, the creation of the Lorentz force results in a sudden collapse of the column of plasma gas through which the arc current flows, but this sudden collapse can only result in the outward propagation of an ordinary acoustic rarefaction wave whose intensity is far less severe than that of a shock wave. Therefore, the noise perceived as a result of this rarefaction wave, although unpleasant, is not as loud nor as dangerous as the noise produced when the arc is quenched.

In normal welding operation, these impulses occur sufficiently frequently to generate an average noise level that is likely to exceed standards established by the Occupational Health and Safety Acts of 1970 (commonly called OSHA). The current practice followed in order to meet the OSHA noise requirements is to limit the length of time a worker can be exposed to welding noise. The time commonly established is ½ hour per 8 hour day, which means that 16 welding machine operators would be required to keep one welding machine in continuous operation for an 8 hour day.

SUMMARY OF THE INVENTION

It is an object of the present invention to reduce the impulse noise produced during changes in the status of welding arcs, particularly during quenching of the arcs, but also during arc ignition. Such reduction in the noise is desirable, first, to minimize or, preferably eliminate the physiological danger to welding machine operators. In addition, it is desirable to reduce the noise incurred during operation of arc welding machines in order to keep it from being excessively uncomfortable for an operator to use such a machine for more than a short length of time, thereby increasing machine utilization and improving the conditions for obtaining better quality products. A still further object of this invention is to make it possible for welding machine operators to work more than the short length of time now permitted each day under OSHA.

When a welding arc is quenched, the current does not cease instantaneously but diminishes relatively slowly at first and then more quickly as it approaches zero. In accordance with the present invention, current sensing means are provided to detect the initial slow drop in arc current indicative of impending extinction of the arc. The sensed current actuates a microprocessor that controls the operating parameters to keep the arc from diminishing suddenly to zero. One of these parameters is the direct voltage of the arc, and the other parameters is a radio frequency (RF) ionization voltage. By increasing the arc voltage or by increasing the RF ionization voltage, it is possible to maintain the arc, even though the arc has started to shift into the quenched condition.

Since the total time required for an arc to quench is of the order of magnitude of 0.02 sec., it is necessary for the control circuit to respond very rapidly, both in recognizing a current change indicative of impending quenching and in producing a changed condition of one or the other of the foregoing parameters to prevent the quenching from taking effect or from taking effect as precipitously as it would normally, in the absence of any effort to control it.

BRIEF DESCRIPTION OF THE DRAWINGS

FIG. 1 is a graph of atmospheric pressure measured close to an arc in an arc welding machine as the arc is ignited and then quenched;

FIG. 2 represents arc voltage variation during the same cycle from a condition of no arc to an ignited arc and then to a quenched condition;

FIG. 3 is a graph of arc current during the same cycle of operation beginning with no arc and continuing through ignition of an arc and subsequent quenching of the arc;

FIG. 4 is a block diagram of an arc control system according to the present invention;

FIG. 14 is a schematic diagram of a voltage sensor embodiment for use in the circuit in FIG. 10;

FIG. 15 is a schematic diagram of a current sensor embodiment for use in the circuit in FIG. 10;

FIG. 18 represents a read-only memory in the microcomputer in FIG. 17;

FIG. 19 shows the connection between the microprocessor and ACIA circuit in FIG. 17;

FIG. 25 shows typical circuits connecting the peripheral interface adapter in FIG. 20 to the gate driving circuits in FIGS. 6 and 7;

FIG. 26 shows a timing circuit for supplying signals to the peripheral interface adapter in FIG. 23;

FIG. 27 shows an analog-to-digital converter for use in the circuit in FIG. 10;

FIG. 28 shows a circuit for connecting the controller in FIG. 24 to the RF driver in FIG. 13;

DESCRIPTION OF THE PREFERRED EMBODIMENTS

Figure 5:
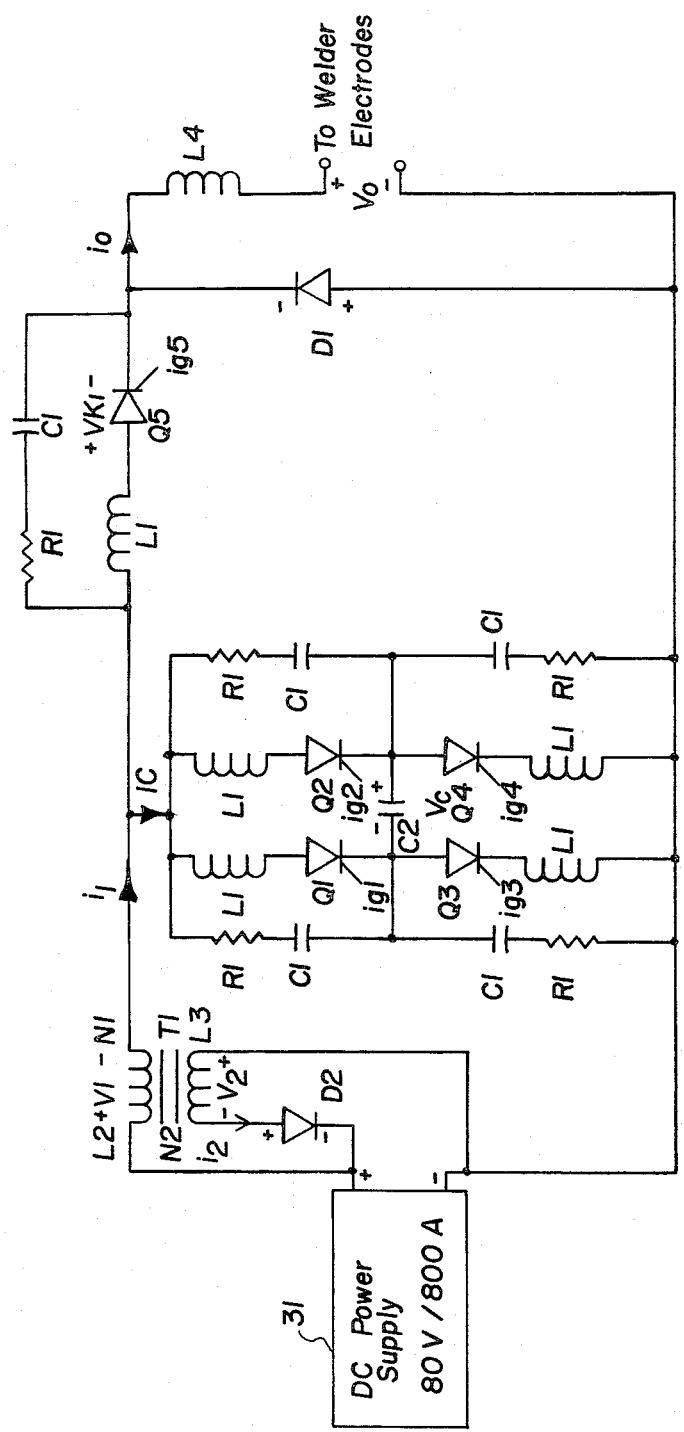
FIG. 5 is a schematic diagram of a circuit embodiment for controlling arc voltage.

The graph in FIG. 1 shows acoustic pressure in the near vicinity of an arc in a welding machine. Rapid change of air pressure is perceived as sound, and the graph illustrates that the pressure varies over a relatively narrow time range preceeding the time $T_1$ at which an arc is ignited. The ignition of the arc creates a hot gas plasma almost instantaneously, which, if unrestrained, would change the atmospheric pressure nearby. However, a Lorentz force is produced by the electric current that produces the arc, and this force tends to constrict the plasma to a limited space. The amount and rate of change of acoustic pressure per unit time is not very great, which means that a shock wave is not produced during ignition of the arc, and therefore, that the amplitude of noise produced when an arc is ignited is not very large, at least in comparison to the amplitude when the arc is quenched, as will be described shortly.

Following the time $T_1$, the acoustic pressure returns to a condition in which it makes limited excursions and, therefore, little noise. At the time $T_2$ quenching of the arc begins. The acoustic pressure changes relatively sharply and to a greater extent than it changed in the interval during the time $T_1$ and $T_2$, but the greatest change in amplitude, and the change that takes place in the shortest time occurs shortly after the time $T_2$ at the time $T_3$, when the arc is fully quenched. At this time, the Lorentz force is no longer effective to constrict the plasma, which thereupon makes its presence known in an explosive manner. Eventually, the variations in acoustic pressure return to the ambient condition.

FIG. 2 and FIG. 3 show the voltage and current conditions corresponding to the atmospheric conditions just described. Prior to the time $T_1$ the current is zero and the voltage is relatively high. When ignition of the arc occurs at the time $T_1$, the voltage drops sharply toward zero and the current begins to build up rather sharply.

As long as the arc is maintained between the times $T_1$ and $T_2$, the voltage remains relatively low and the current remains relatively high. When quenching begins at the time $T_2$, the voltage takes a sudden rise and the current starts to diminish. The present invention makes use of the fact that, during quenching interval, the current does not diminish as sharply at the beginning as it does at the end of that interval. Just before the time $T_3$, the current takes a sudden sharp drop to zero, and the voltage makes a sudden sharp rise, as would be necessary to attempt to maintain the arc. As may be seen by comparing FIGS. 1 and 3, the sudden, final drop of current at the time $T_3$ corresponds to the sharpest change in atmospheric pressure. By controlling the drop of current, and spreading it out over a period of time, the sudden change in atmospheric pressure may be reduced, thereby reducing the concomitant loud impulse noise.

FIG. 4 shows a circuit capable of controlling the conditions of an arc in accordance with the present invention. This circuit includes a direct current (DC) power supply 31. Current from the power supply passes through a shunt current monitor 32 in which the magnitude of the current is sensed and a signal is generated that is transmitted to a microcomputer 33. One output of the microcomputer 33 is connected to a direct voltage control 34 and another output is connected to a radio frequency (RF) plasma resistance control circuit 36. Arc electrodes 37 are connected to the power supply by way of the direct voltage control 34, the shunt monitor 32, and the RF control 36.

As may be noted in FIG. 3, the time required to quench an arc beginning with the $T_2$ and ending with the time $T_3$ is approximately 20 milliseconds. During that interval of time, the circuit in FIG. 4 must recognize that a quench has started and must be able to modify the direct voltage or the RF rapidly enough to reduce the noise amplitude that will take place at the time $T_3$. This means that the circuit must examine the current magnitude a number of times within the 20 ms interval and must determine the rate of change of current between successive examinations and then must actuate correcting circuits via programmed control.

FIG. 5 shows a direct voltage control circuit of the type suitable for use as the control 34 in FIG. 4. This circuit is connected to be supplied by the DC power supply 31 which, typically, is capable of producing about 400-800 amperes at about 40-80 volts. (All SCR's may have to be current shared with parallel SCR's to handle 800A). One way of controlling the voltage to be applied to the electrodes would be to place a variable impedance in series with the power supply 31 and control the magnitude of the impedance. However, the loses involved would be enormous and expensive. There are other ways of controlling the voltage, but the large current involved and the need for high speed operation makes the circuit in FIG. 5 particularly attractive.

The basic control element in FIG. 5 is a silicon controlled rectifier (SCR) $Q_5$, which is in series with the power supply line to the welder electrodes. SCRs capable of handling currents of 1000 amperes or more and capable of being turned on and off as rapidly as is necessary in the present invention have recently become available. One such silicon controlled rectifier is the type C 444M SCR made by General Electric. Another is type C445.

An SCR has a main anode-cathode circuit and a gate electrode. When a proper level of current is introduced into the gate electrode, the circuit between the anode and cathode becomes conductive and is capable of carrying a very large current. However, once the current starts in the anode-cathode circuit, the gate electrode is not effective to turn off that current. There are gate controlled thyristors, but they are not satisfactory for the purpose of the present invention. In order to halt the main current flow to the anode-cathode circuit of the SCR $Q_5$, it is necessary to produce a condition equivalent to reversal of polarity of the voltage supply to which the SCR is connected. If the supply 31 were an AC supply, the simple reversal of direction of flow of the alternate current would be sufficient, but the supply 31 is a DC supply, and therefore other means must be used.

In order to reverse the polarity of voltage to which the SCR $Q_5$ is connected, a capacitor $C_2$ is provided in a bridge circuit comprising four other SCRs $Q_1$-$Q_4$, which are similar to the SCR $Q_5$. Assume that the capacitor is initially charged with the polarity indicated in FIG. 5 so as to have a voltage of approximately 160 volts across it. At the time the SCR $Q_5$ is to be made nonconductive, the SCRs $Q_1$ and $Q_4$ are made conductive by applying suitable gate current to their gates. Immediately, the anode of the SCR $Q_5$ is no longer connected to a positive voltage of 80 volts but to a negative voltage of 160 volts.

The SCR cannot continue to conduct when connected to a voltage of the latter polarity, but it is the nature of an SCR that it cannot cease to conduct instantaneously. A small time $t_q$ must elapse. As a result, the capacitence of the capacitor $C_2$ must be large enough to cause it to maintain a reverse polarity on the SCR $Q_5$ for at least the length of time determined by $t_q$.

Figure 9:
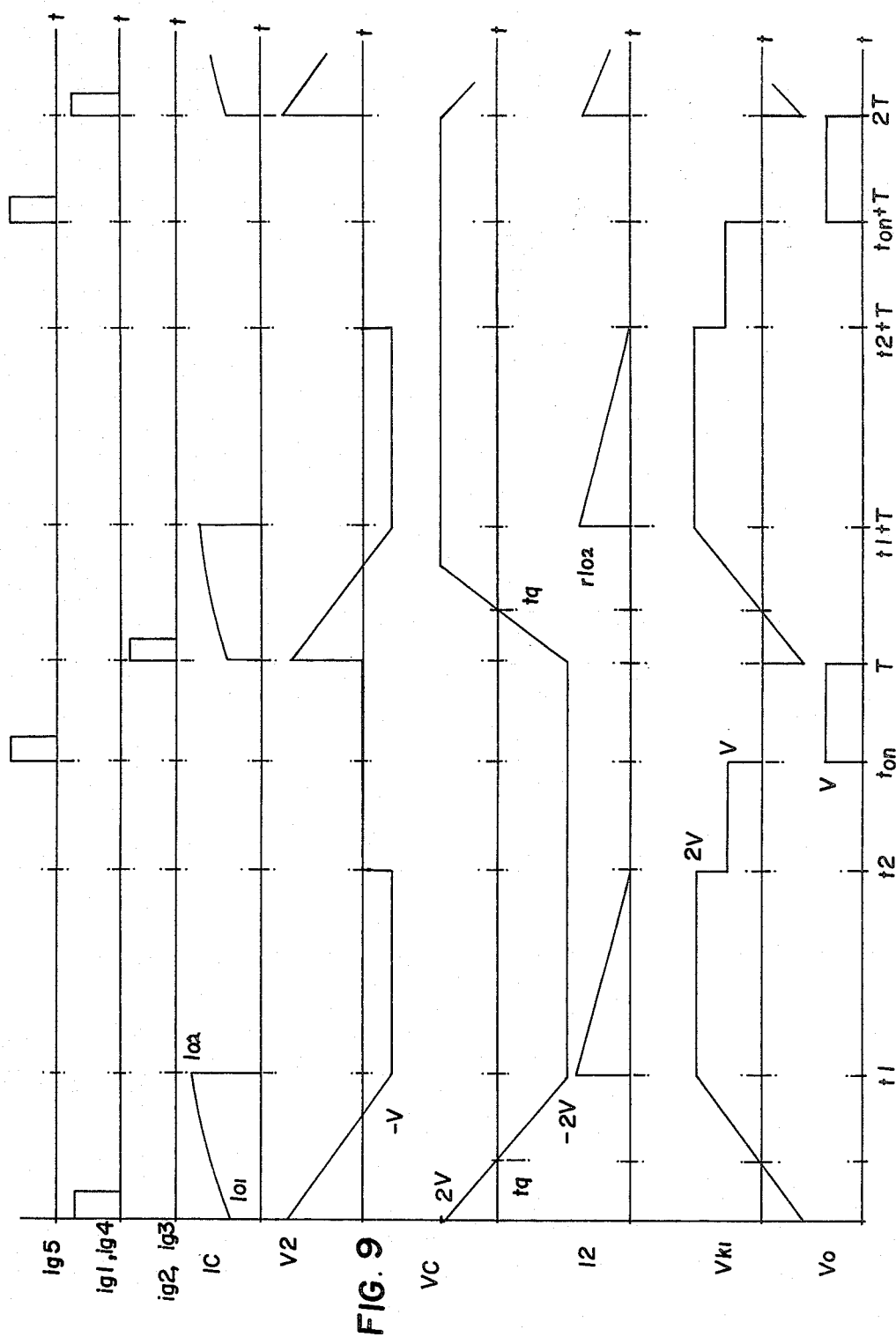
FIG. 9 is a timing diagram of related components in the circuit in FIG. 5.

FIG. 9 shows voltages and currents at various points in the circuit in FIG. 5, beginning at the instant the SCRs $Q_1$ and $Q_4$ are turned on by gate currents $i_{g1}$ and $i_{g4}$.

At the time $t_1$, the voltage $V_2$ across the secondary of the transformer $X_1$ is minus 80 volts, which is equal and opposite to the output voltage of the power supply 31. This permits the diode $D_2$ to begin to conduct. The voltages $V_1$ and $V_2$ across the two windings of the transformer $X_1$ and the voltage VC across the capacitor $C_2$ are clamped, so that the current IC drops to zero at the time $t_1$. The energy stored in the transformer $X_1$ is returned to the power supply 31 during the interval between the times $t_1$ and $t_2$ and when the current $I_2$ finally reaches zero, the commutation cycle is complete.

During the inverval between the initiation of commutation and the time $t_1$, the voltage across the capacitor $C_2$ has gone from 160 volts in one polarity to 160 volts in the opposite polarity, and is thus indicated in FIG. 9 as having the value minus 2 V, where V is the voltage of the power supply 31.

At a later time $t_{on}$ shown in FIG. 9, the SCR $Q_5$ is again made conductive. This connects the 80 volt power supply 31 to a smoothing choke $L_4$. At a still later time T as shown in FIG. 9, when the SCR $Q_5$ is again to be made nonconductive, it is necessary to actuate the SCRs $Q_2$ and $Q_3$ because of the fact that the polarity of voltage across the capacitor $C_2$ is the reverse of what it was assumed to be at the beginning of the description of operation of the circuit in FIG. 5. The operation of the transformer $X_1$ takes place in the same manner as previously, since it is immaterial that the capacitor $C_2$ is charged in the reverse polarity than previously. By the time $t_{on}$ plus T, the capacitor $C_2$ has again been charged to the voltage 2 V with the same polarity that it had initially. When the current $I_2$ again reaches zero, the second commutation of the SCR $Q_5$ is complete.

By becoming periodically conductive for short intervals of time, the SCR $Q_5$ allows pulses of current to reach the choke $L_4$. Instead of allowing such pulse to pass through to the welding electrodes, the choke acts to smooth them out so that the output direct voltage applied to the electrodes is an integrated value depending on the duty cycle of the voltage pulses between each of the times $t_{on}$ plus nT and T Plus nT, where n is any integer from zero up. The average voltage applied to the welding electrodes is, therefore, always less than the nominal output voltage of the power supply 31 but approaches that value closely as the duty of the pulses increases.

The operation of the SCR $Q_5$ may be considered to be that of a switch that alternately opens and closes. Since the result of opening and closing that switch repetitively is the production of a series of pulses, the circuit may also be considered to be the equivalent of a pulse width modulated oscillator circuit. Because the current is chopped into pulses, instead of being constant, the circuit in FIG. 5 may be referred to as an SCR chopper.

One of the limitations on the operation of the circuit in FIG. 5 is the maximum rate of chopping, or commutation, of the current. As stated previously, this is limited by the intrinsic time $t_q$ of the SCR $Q_5$. With the circuit of the present invention, it has been found that the minimum commutation time is about 50 microseconds. Therefore, the maximum repetition rate of the SCR chopper in FIG. 5 with a 50% duty cycle is about 10 kHZ. The GE type C 444 SCR will turn on when its gate is supplied with a 2.5 ampere pulse having a voltage of 10 volts with respect to the cathode and having a duration of 5 microseconds approximately.

It will be noted in FIG. 5 that there is an inductor $L_1$ in series with each of the SCRs. The purpose of this inductor is to prevent a sudden inrush of current when the SCR is connected to a source of voltage, because such inrush of current could produce undesired actuation of the SCR. Furthermore, each of the SCR circuits includes a resistor $R_1$ and a capacitor $C_1$ connected in series with each other and in parallel with the series circuit consisting of the inductor $L_1$ and the anode-cathode circuit of the respective SCR. The capacitor $C_1$ is a snubber capacitor that prevents excessively fast operation for the circuit.

Figures 6, 7, 8:
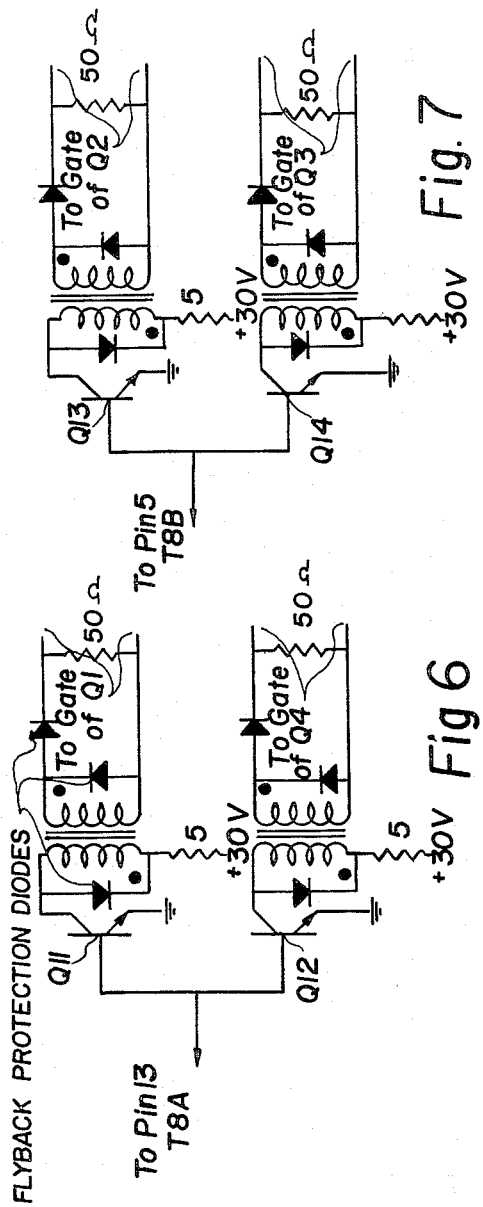
FIGS. 6-8 are circuit embodiments for controlling silicon controlled rectifiers in the circuit in FIG. 5.

FIGS. 6-8 show essentially identical actuating circuits for each of the SCRs $Q_1$-$Q_5$ in FIG. 5. Each of these actuating circuits includes a transistor in series with the primary of a transformer that has its secondary connected between the gate and cathode of a respective one of the SCRs. Since the SCRs $Q_1$ and $Q_4$ are made conductive simultaneously, the basis of their controlling transistors $Q_{11}$ and $Q_{12}$ are connected together to be supplied by an operating pulse simultaneously. In a similar manner, the bases of transistors $Q_{13}$ and $Q_{14}$ that control signals to the gates of the SRCs $Q_2$ and $Q_3$ are also connected together to be controlled simultaneously. The gate of the SCR $Q_5$ is controlled by signals applied to the base of transistor $Q_{15}$. Various flyback diodes are shown to handle the protection of the semiconductor components from inductive transformer switching transients.

Having described the means by which it is possible to turn the SCR $Q_5$ on and off and the effect on the direct voltage applied to the welding electrodes of thus commutating the SCR $Q_5$, it remains to describe how the system recognizes the necessity of commutating the SCR $Q_5$. It is also appropriate at this point to describe the way that the system determines the proper direct voltage to be applied to the welding electrodes at any instant in order to minimize impulse noise, and the frequency and duty cycle of commutating signals to effect the desired voltage level.

Figure 10:
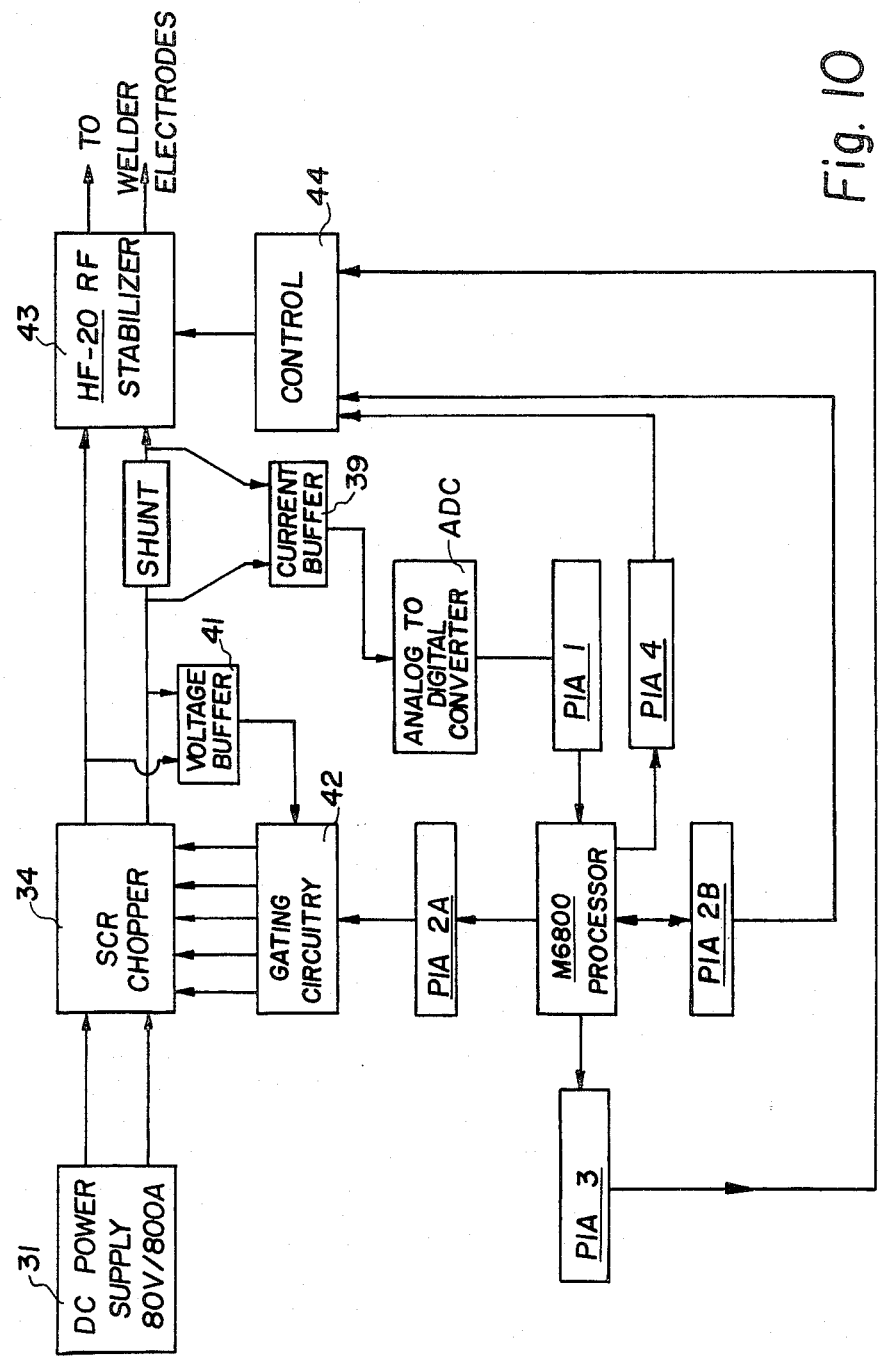
FIG. 10 is a block diagram showing a circuit embodiment similar to that in FIG. 4 but in greater detail.

FIG. 10 shows a circuit for a complete control system similar to that in FIG. 4 but with more details illustrated.

The microcomputer 33 in the embodiment of FIG. 4 is constructed around microprocessor M6800 made by the Motorola Company. The microprocessor M6800 is connected to the other parts of the circuit by way of peripheral interface adapters PIA 1, PIA 2A, PIA 2B, PIA 3, PIA 4, as shown in FIG. 10. PIA 4 controls the amplitude of the RF. The shunt current monitor 32 is connected through a current buffer 30 to an anolog-to-digital converter ADC, the output of which is connected to the adapter PIA 1.

The output voltage of the SCR chopper 34 is connected to a voltage buffer 41, the output of which is connected to gating circuitry 42, which may consist of the circuits shown in FIGS. 6–8, and which are connected to the SCR chopper 34 to control the SCRs $Q_1$–$Q_5$ as described previously. The gating circuitry 42 is connected to the microprocessor M6800 by way of the adapter PIA 2A so that the microprocessor M6800 can control the operation of the gating circuitry to determine the proper duty cycle of the SCR chopper 34. The flyback protection diodes shunt the inductive transient which occurs when the drive transistor goes out of saturation.

The RF plasma resistance control 36 in FIG. 4 includes a circuit 43 for producing a broad band RF signal between zero and 5 MHz. A specific circuit embodiment used is a Miller HF-20 high frequency unit which generates RF by a spark gap. The RF energy is coupled by a coil in series with the lead to one of the welder electrodes. A control circuit 44 controls the operation of the HF-20 RF stabilizer 43 and is, in turn, controlled by signals from the adapters PIA 2B and PIA 3. The latter are controlled, in turn, by the microprocessor M6800.

Figure 11:
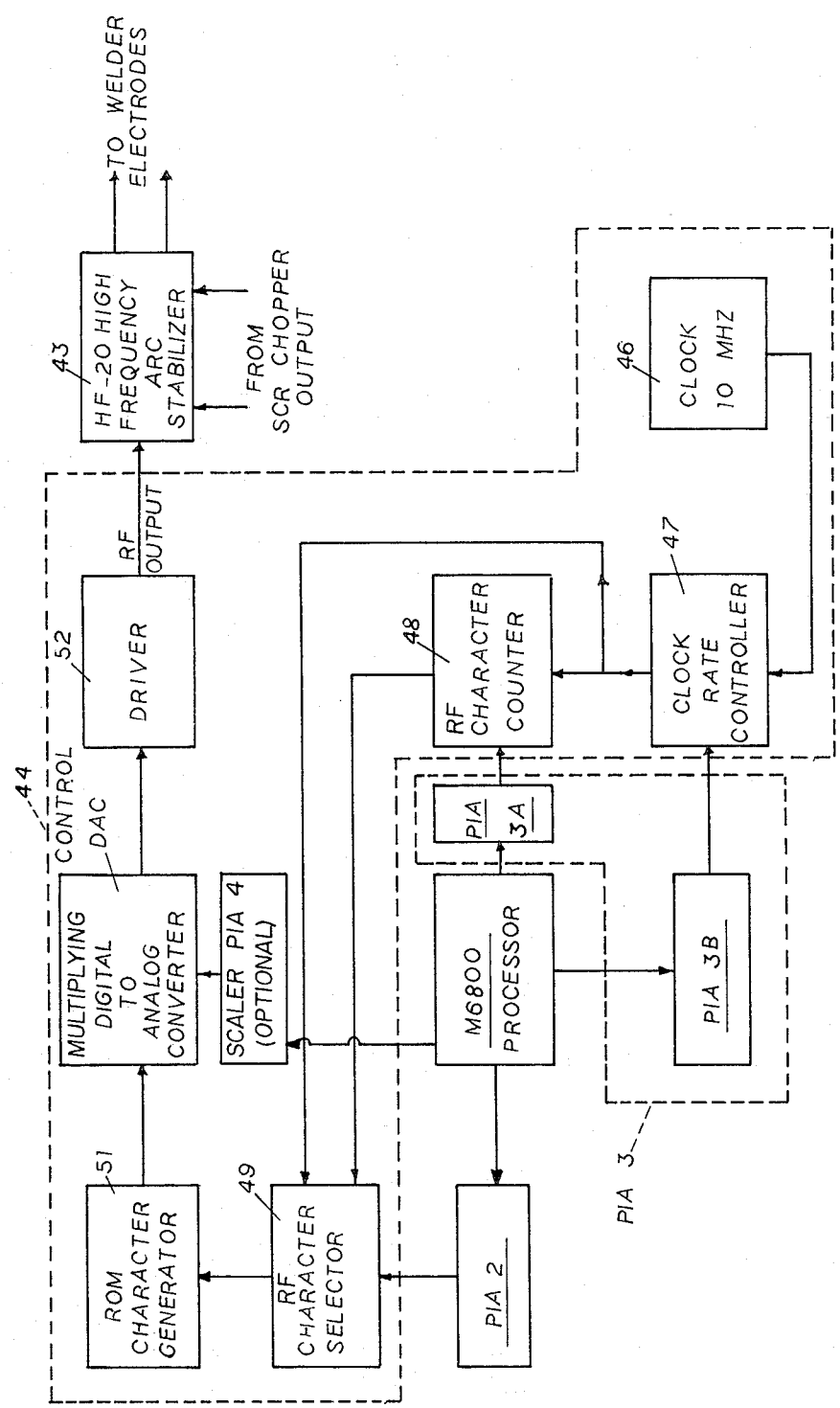
FIG. 11 shows, in still greater detail, a block diagram of part of the circuit in FIG. 10.

FIG. 11 shows the RF circuit in greater detail, particularly the control circuit 44. As shown in FIG. 11, the adapter PIA 3 actually has two sections PIA 3A and PIA 3B. The control circuit 44 includes a 10 MHz clock generator 46 connected to a clock rate controller 47. The latter is controlled by the adapter PIA 3B to determine the rate at which pulses of the RF energy should be applied to the welding electrodes. The output of the clock rate controller 47 is connected to a character or waveform counter 48 and to a character selector 49. The counter rate 48 is controlled by the microprocessor M6800 through the adapter PIA 2.

Figure 16:
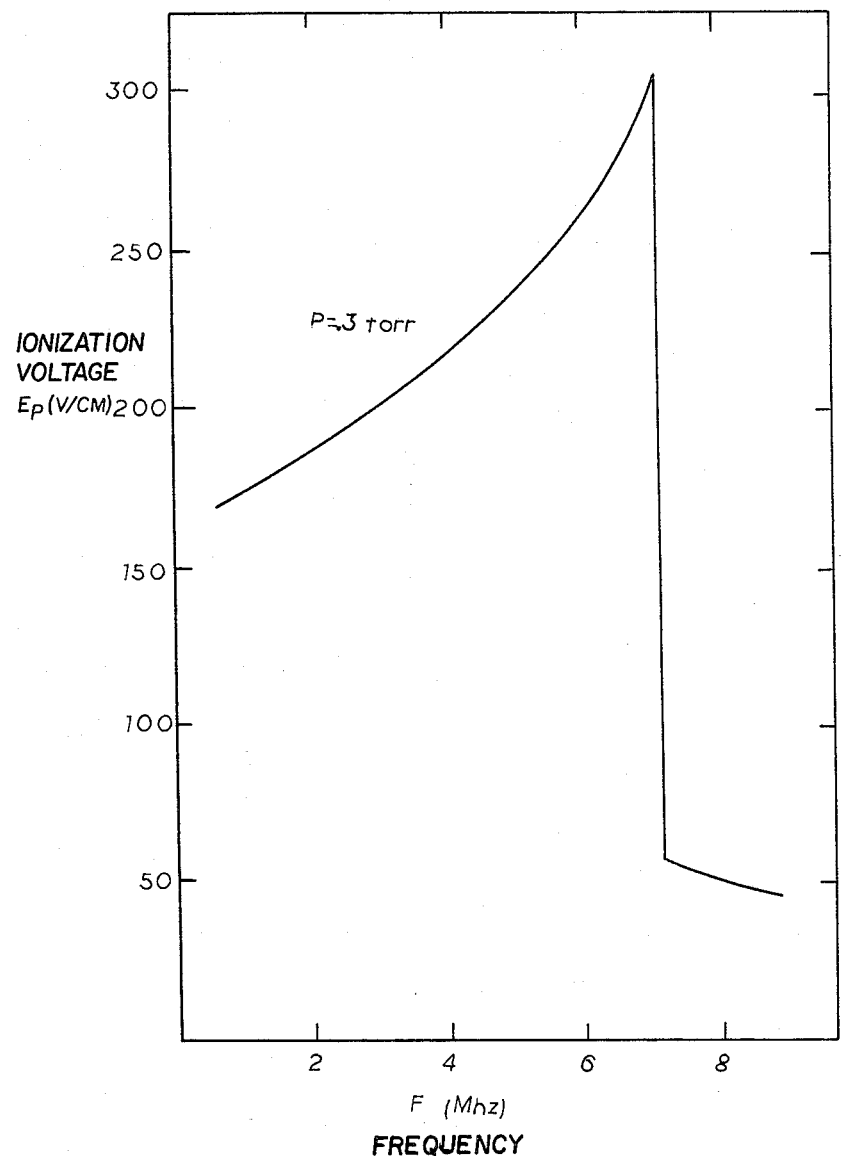
FIG. 16 is a graph of ionization voltage versus frequency of a plasma arc.

The character selector 49 is also controlled by the character counter 48 and in turn supplies signals to a read-only memory, or ROM, character generator 51. The ROM has information stored it it regarding the effect of the RF energy on ionization of the gas in the area of the welding electrodes. FIG. 16 shows the relationship between the RF frequency and the ionization voltage, which is part of the information stored in ROM 51. In addition, information is stored as to the necessary amount of RF energy to maintain the arc in an unquenched condition.

The output of the ROM 51 is applied to a multiplying digital-to-analog converter DAC, and the resulting output signal of the converter DAC is applied to a driver circuit 52. The RF output of the driver circuit, in turn, is applied to the stabilizer circuit 43 and thence to the welder electrode 37 shown in FIG. 4. The optional scale factor of the multiplying DAC is supplied via PIA 4.

Figure 13:
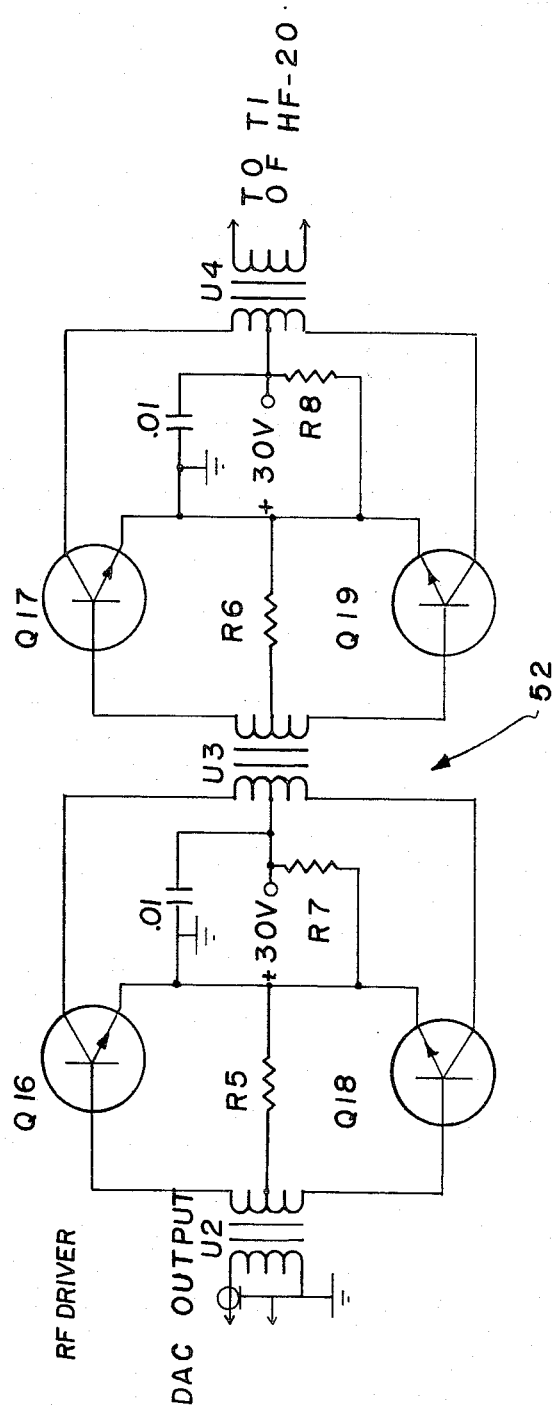
FIG. 13 is a schematic diagram of an RF driver for the arc stabilizer in FIG. 11.
Figure 12:
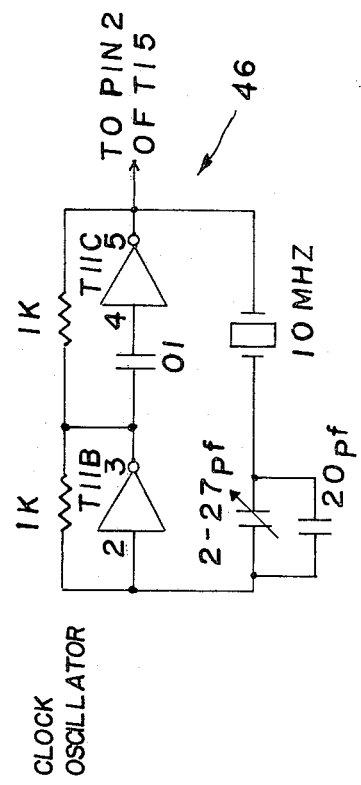
FIG. 12 is a schematic diagram of a clock oscillator for use in the circuit in FIG. 11.

FIG. 12 shows a typical 10 MHz clock oscillator 46 and FIG. 13 shows a two stage, untuned, push pull driver circuit 52.

FIGS. 14 and 15 are essentially identical circuits that operate as sensors. The input terminals 56 of the voltage sensor circuit in FIG. 14 are connected across the output terminals of the SCR chopper 34, so that the circuit in FIG. 14 is essentially the voltage buffer 41 in FIG. 10. This circuit converts the 80 volt pulse signal that exists at the cathode of the SCR $Q_5$ to a signal that is either zero or plus 5 volts at the input to a comparator T29A. When the SCR $Q_5$ is conductive, the output of the comparator T29A is zero volts; when the SRC $Q_5$ is switched off, the output of the comparator T29A is plus 5 volts.

In setting up the system initially, the voltage sensor circuit in FIG. 14 may be used to record voltage pulses generated to correspond to the acoustic noise signals in FIG. 1. The 0 to 80 volt input of the op-amp T25A is connected to the welder electrodes 37 (FIG. 4), and the output of an op-amp T25B, which is the second op-amp in the chain in FIG. 14, is connected to a chart recorder. (used only to record the signals and not required normally) Occurrence of acoustical noise impulses can be anticipated by sampling the current from the power supply 31 in FIG. 4 and checking for a gradual decrease in amplitude of the current waveform which would indicate the initiation of a quenching interval, such as that between the times $T_2$ and $T_3$ in FIG. 3. The circuit in FIG. 15 is the circuit used for measuring arc current. This circuit measures the voltage drop caused by current, which may be anywhere from zero to several thousand amperes, flowing in the shunt. The voltage drop thus produced is converted to a zero to five volt analog signal at the output of an op-amp T28B to be connected to the analog-to-digital converter ADC.

Figure 17:
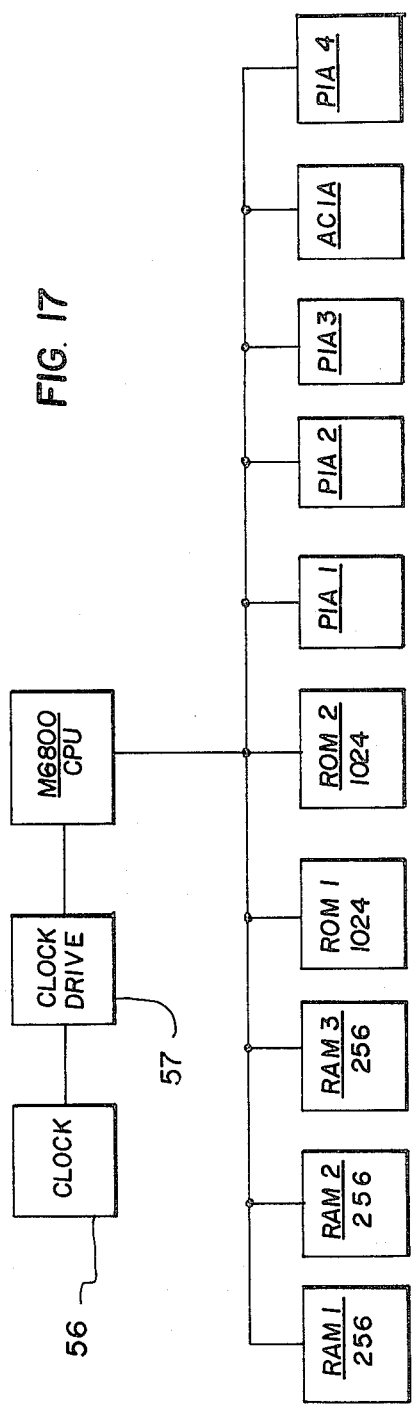
FIG. 17 is a block diagram illustrating the architecture of the microcomputer in FIG. 10.

FIG. 17 is a block diagram of the microcomputer architecture including a clock source 56 connected to a clock driver 57 which, in turn, is connected to the microprocessor CPU M6800. The latter is connected by a bus to several random-access member (RAM) circuits RAM 1-RAM 3, each of which is capable of storing 256 bytes of information. Also connected to the bus are two ROMs; ROM 1 and ROM 2, each of which is capable of storing 1024 bytes of information, the three peripheral interface adapters PIA 1-PIA 3 referred to previously, and the ACIA circuit.

FIG. 18 shows the ROM 1 to which the address lines A10 and A15 are connected by way of an AND circuit T 1C and an inverter T 2D.

The microprocessor MC6800 is shown in FIG. 19 and the only other integrated circuit included in that figure is the ACIA, which is a Motorola MC6850 integrated circuit and is used to connect to an optional teletypewriter interface.

Figure 20:
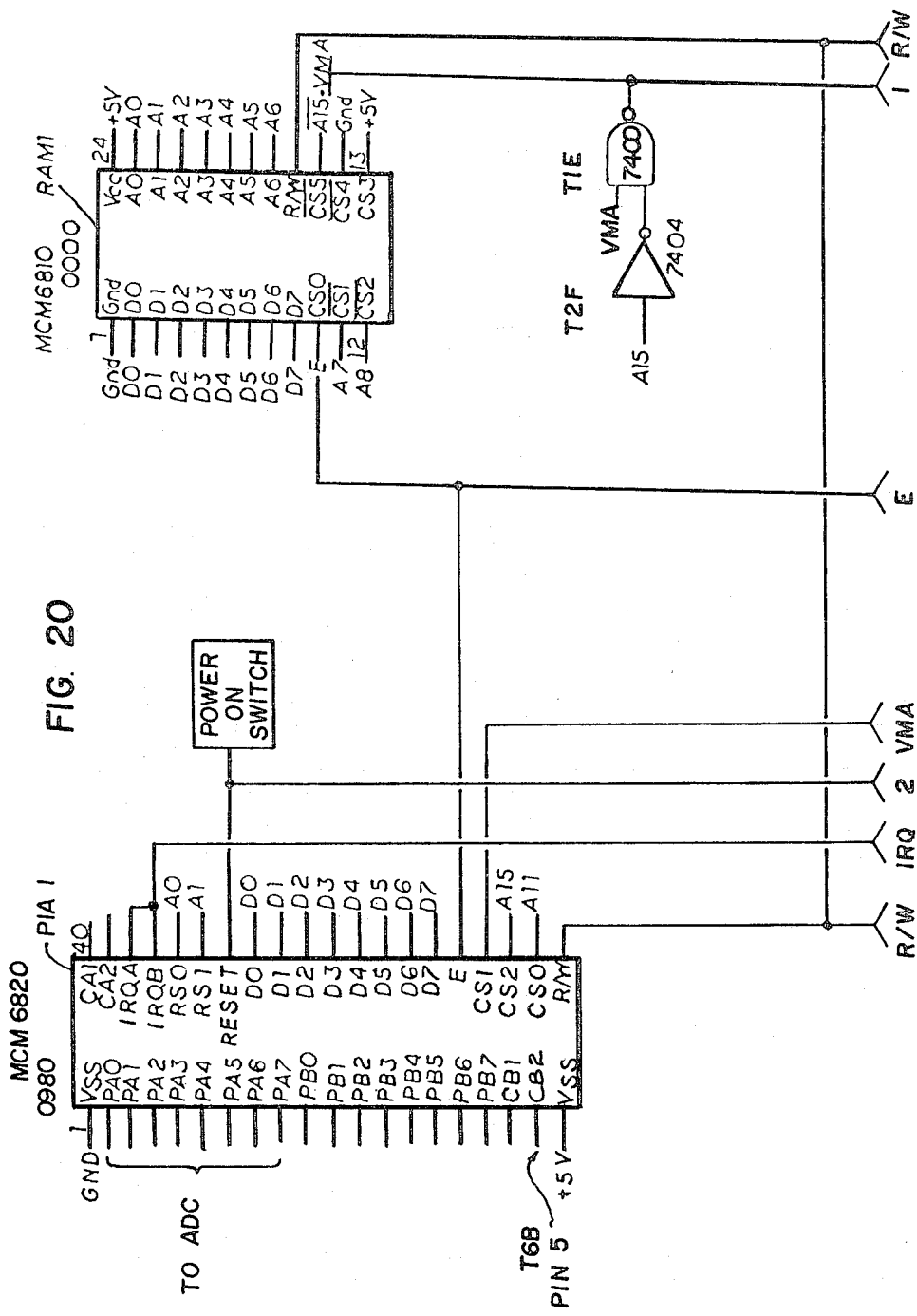
FIG. 20 illustrates the peripheral interface adapter and random access memory in the microcomputer in FIG. 17.

The adapter PIA 1, which is a Motorola MCM6820 integrated circuit is shown in FIG. 20 connected to RAM 1, which is a Motoroloa MCM6810 IC.

Figure 21:
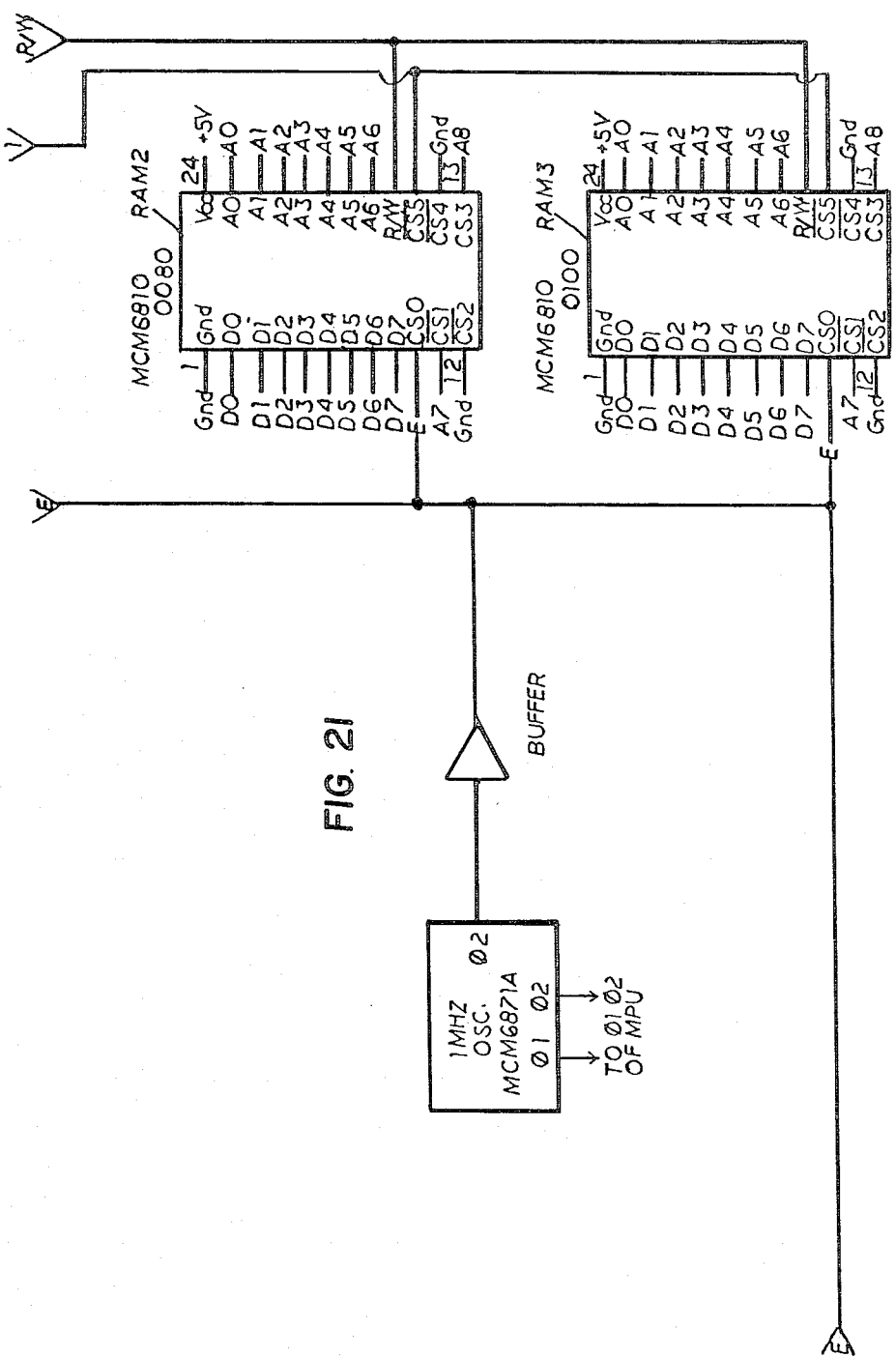
FIG. 21 shows the connection between a timing oscillator and two random access memories in the microcomputer in FIG. 17.

The memories RAM 2 and RAM 3, which are also Motorola MCM6810 ICs, are shown in FIG. 21 along with MHz oscillator to supply pulse signals to these RAMs.

Figure 22:
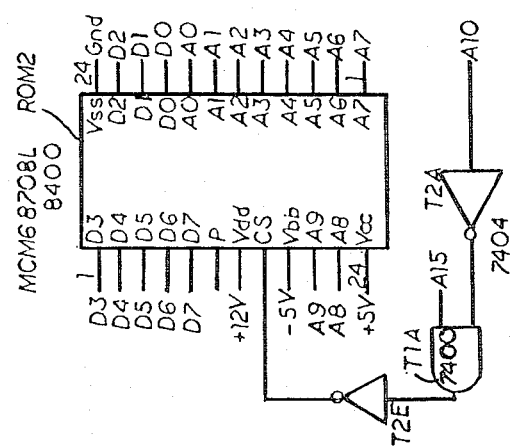
FIG. 22 shows another read-only memory for use in the microcomputer in FIG. 17.

FIG. 22 shows the memory ROM 2, which is a Motorola MCM68708L IC controlled by signals from the address line A 15 and inverted signals from the address line A10.

Figure 23:
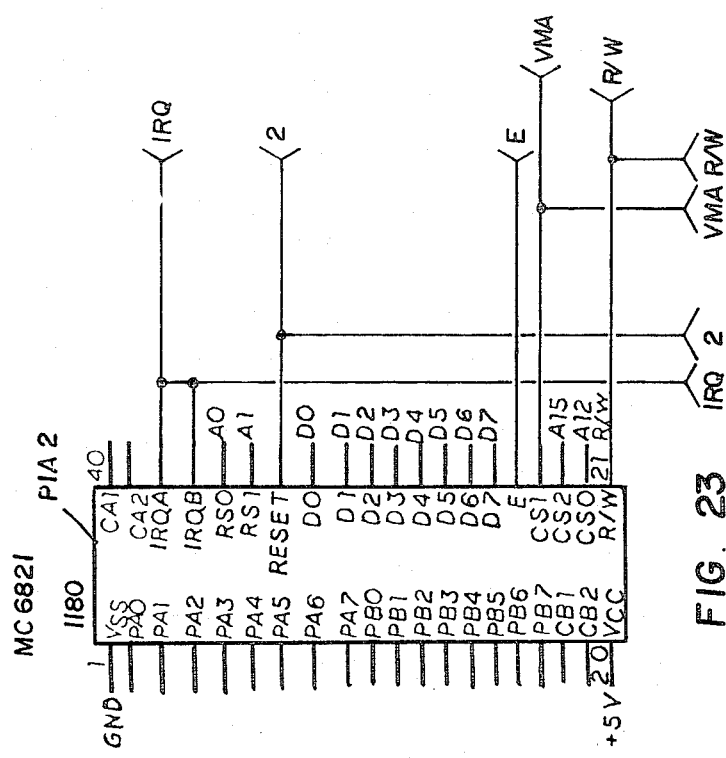
FIG. 23 shows connections to another peripheral interface adapter for use in the microcomputer in FIG. 17.

FIG. 23 shows the adapter PIA 2, which is also a Motorola MC6820 IC, like adapter PIA 1.

Figure 24:
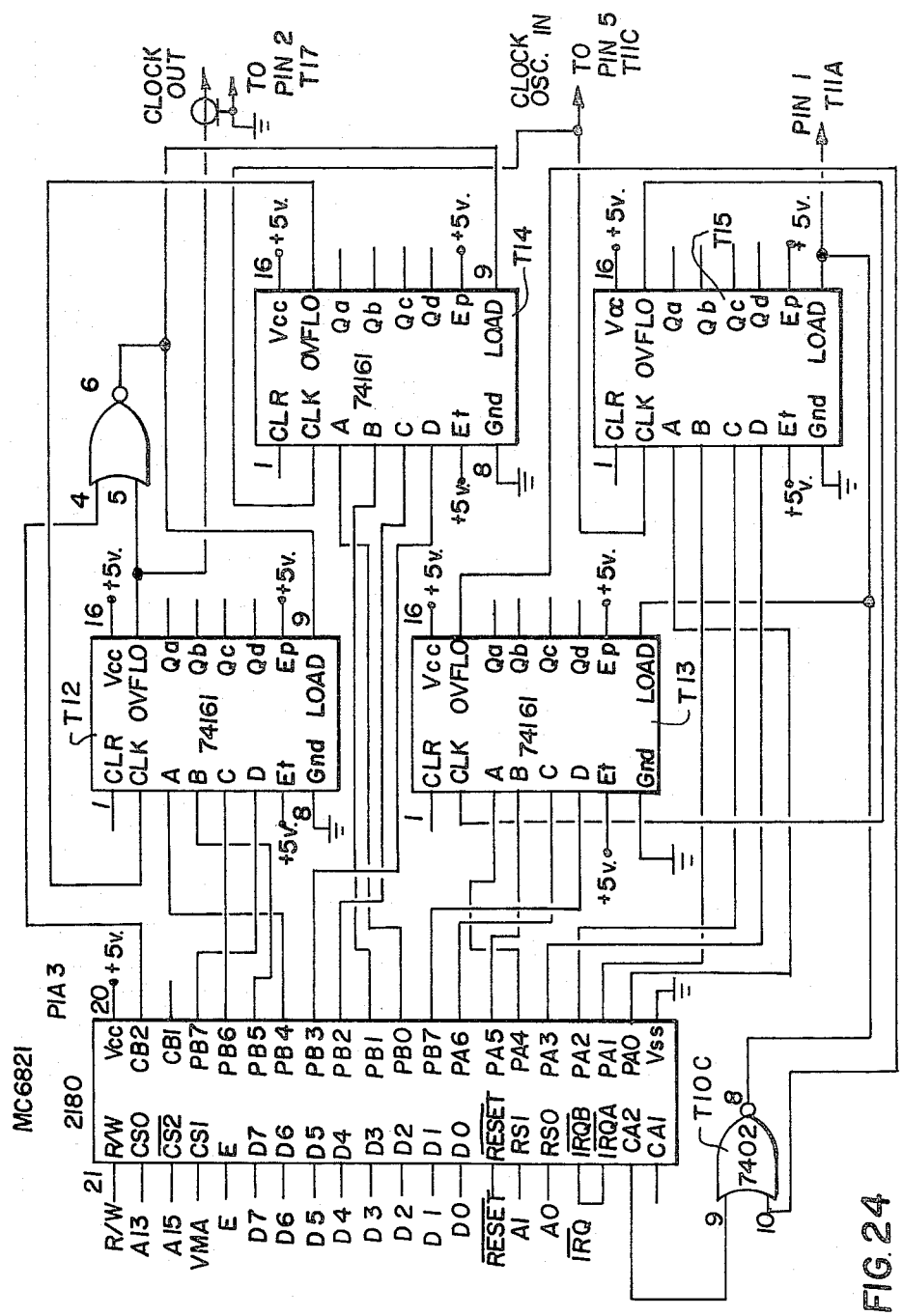
FIG. 24 illustrates connections between still another peripheral interface adaptor and a series of counting circuits to be used in conjunction with the microcomputer in FIG. 17.

FIG. 24 shows the third adapter PIA 3, which is the same type of IC as the other two adapters PIA 1 and PIA 2. The adapter PIA 3 is connected to four counting circuits T 12–T 15.

The circuit in FIG. 25 includes a one-shot multivibrator T6B connected to the adapter PIA 1 in FIG. 20 to receive control signals therefrom. The output of the one-shot T6B is connected to two other one-shots T8A and T8B that provide output signals alternately, either to the transistors $Q_{11}$ and $Q_{12}$ in FIG. 6 to actuate the SCRs $Q_1$ and $Q_4$, or to the transistors $Q_{13}$ and $Q_{14}$ in FIG. 7 to actuate the SCRs $Q_2$ and $Q_3$.

The circuit in FIG. 26 includes a clock signal generator CLK2 connected through a NAND gate T7C to counters T18 and T19 to divide the frequency of the signal from the clock CLK2. The counters are type 74161 and the output of counter T19 drives a one-shot T9A to produce a $20_{ns}$ pulse. To protect 211–215, pulse to gate is 6.2 usec.

FIG. 27 shows a current sensor interfacing circuit to the microprocessor M6800. This interfacing circuit uses double buffering and includes the Analog Device Model ADC0816 A/D converter ADC supplied with IMHz counting pulses from a clock circuit identical to clock CLK2. Signal from the adapter PIA 1 in FIG. 2 cause a one-shot T5A to produce a 200 ns pulses that reaches the start terminal of the A/D converter ADC by way of a NOR gate T4A and an inverter T3B. The output of the inverter T3B also serves as a clock signal for a flip-flop T6A to control two NAND gates T7A and T7B. These gates are enabled alternately by signals from the flip-flop T7A to allow them to pass signals CA1 and CB1 to the adapter PIA 1.

The circuit in FIG. 28 includes the digital/analog converter DAC, model DAC-08BM, in FIG. 11 and circuits to control its operation. A nonmultiplying DAC is shown in this figure, however, in a refinement of this design a multiplying DAC with a scale factor (specified in PIA 4) has been found to provide improved performance. The letter circuit include a third Motorola MBM68708 L read-only memory ROM 3 that receives the output of a pair of type 74161 counting circuit T16 and T17 counting clocking signals from the counter T12 in FIG. 24 and loaded by signals from a NOR circuit T10C in FIG. 24.

Figure 29:
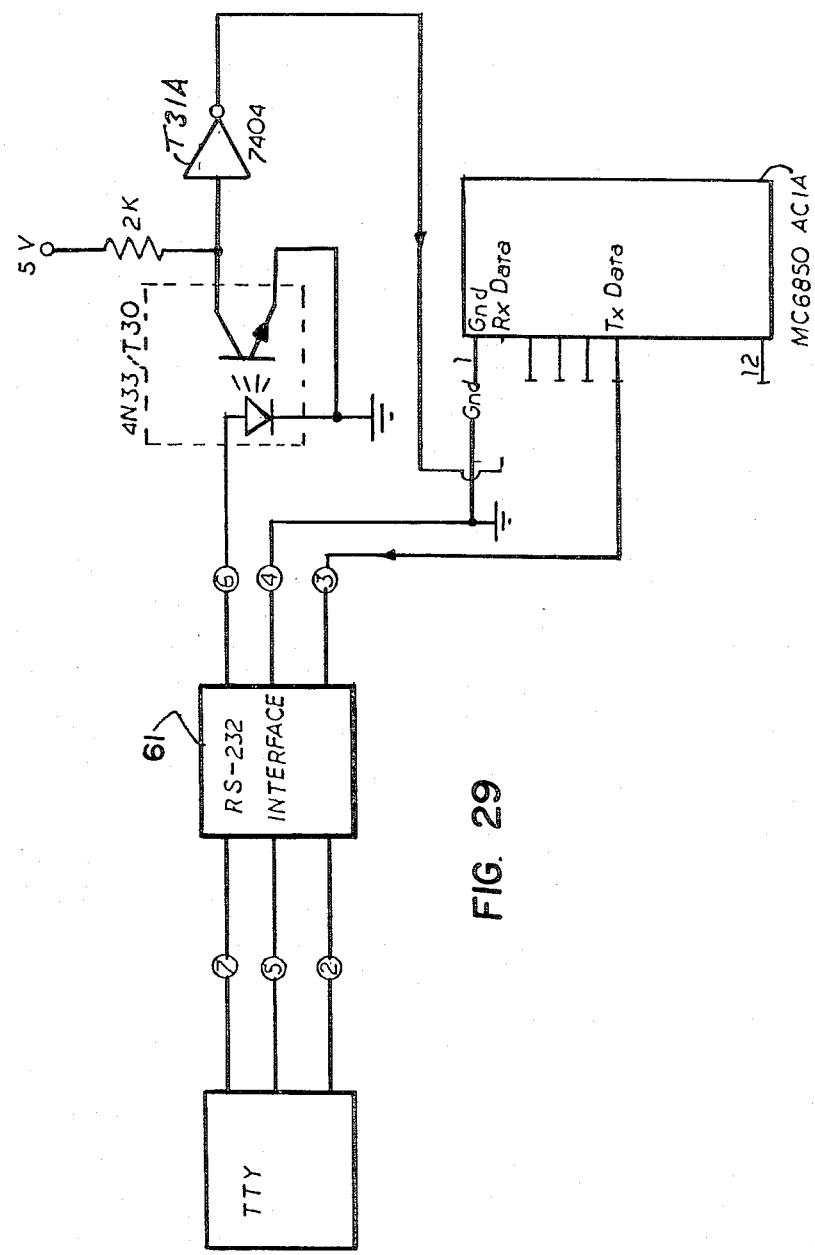
FIG. 29 shows a circuit for connecting an optional teletypewriter to the ACIA circuit in FIG. 19.
Figure 30:
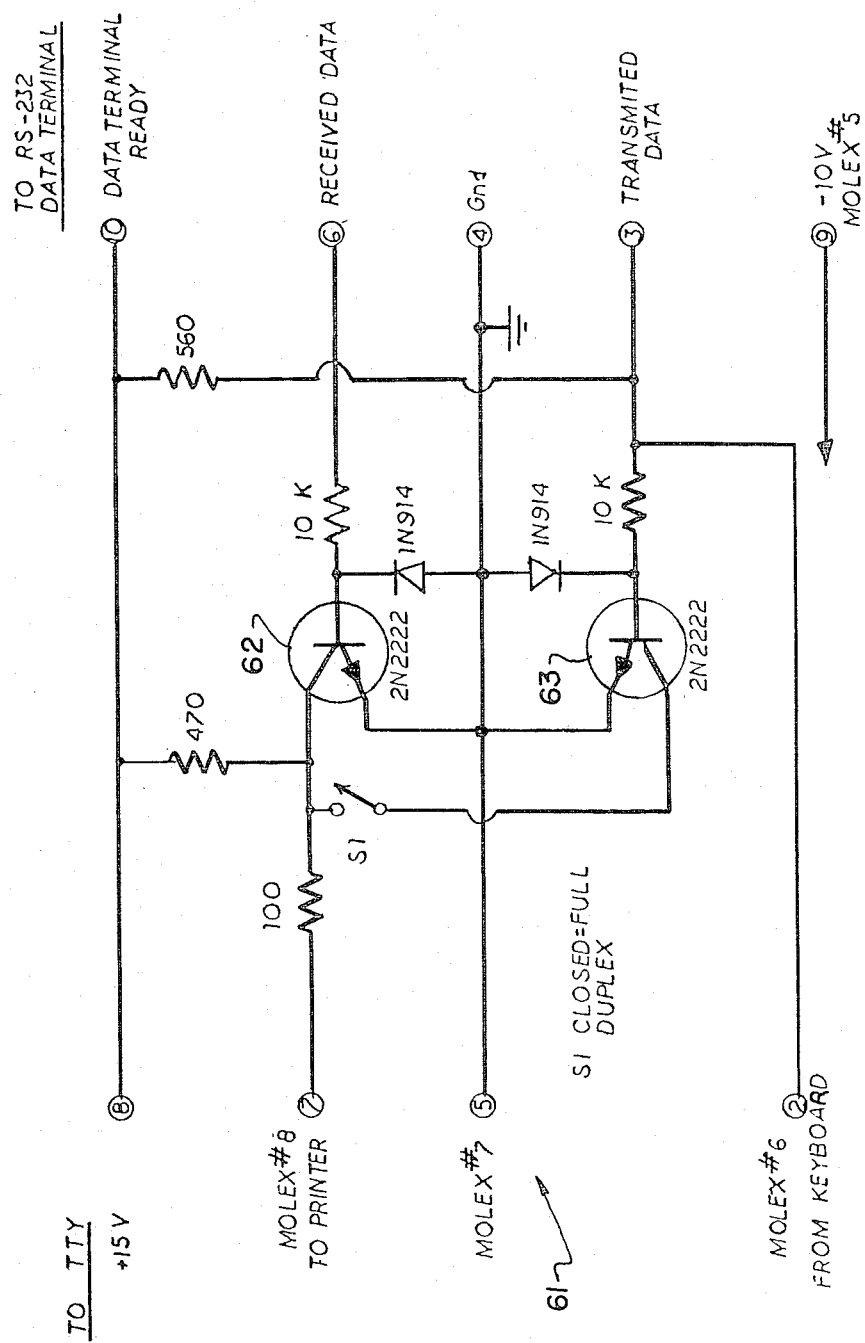
FIG. 30 is schematic diagram of an RS-232 interface for use in the circuit in FIG. 29.
Figure 31:
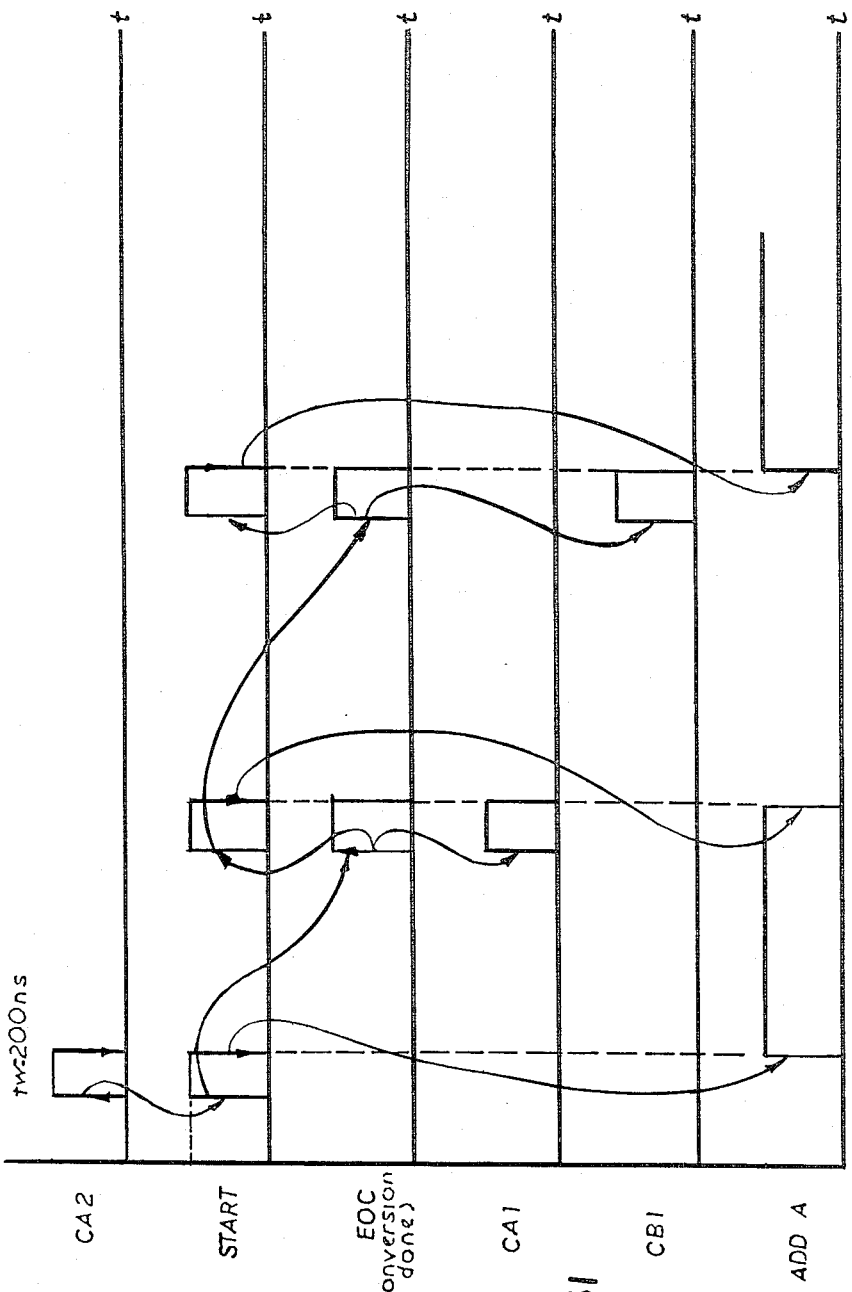
FIG. 31 is a timing diagram for operation of the microcomputer in FIG. 17.
Figure 32:
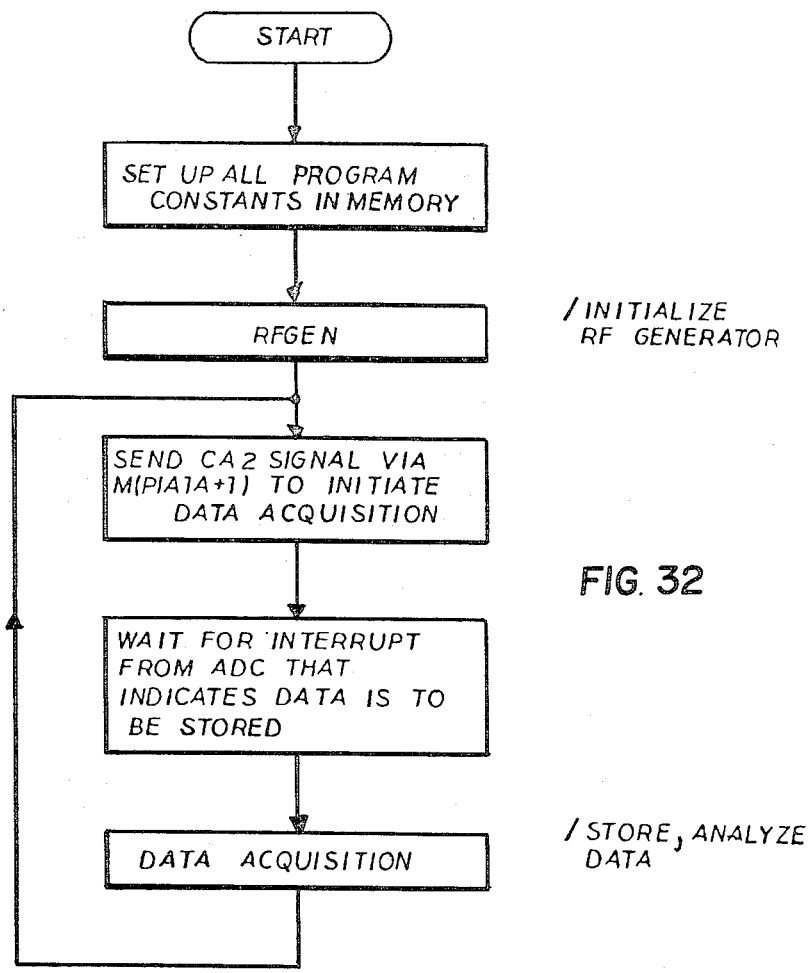
FIGS. 32-35 are flow charts for operation of the system in the foregoing figures.
Figure 33:
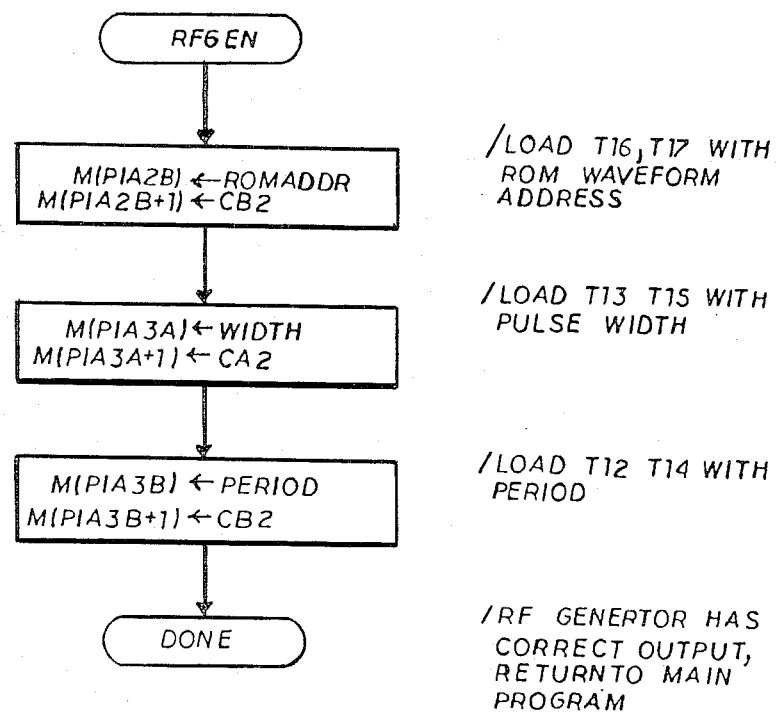
Figure 34:
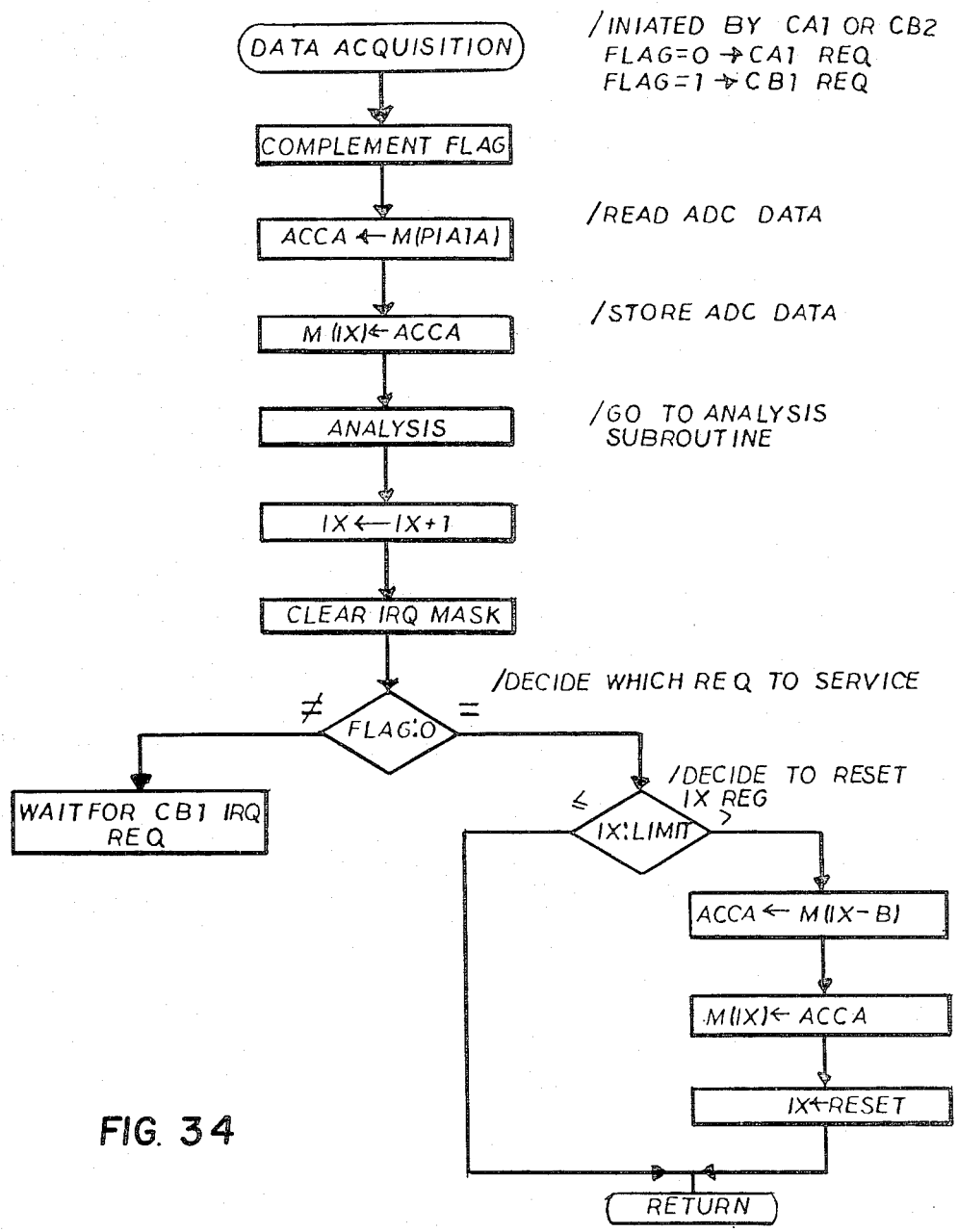
Figure 35:
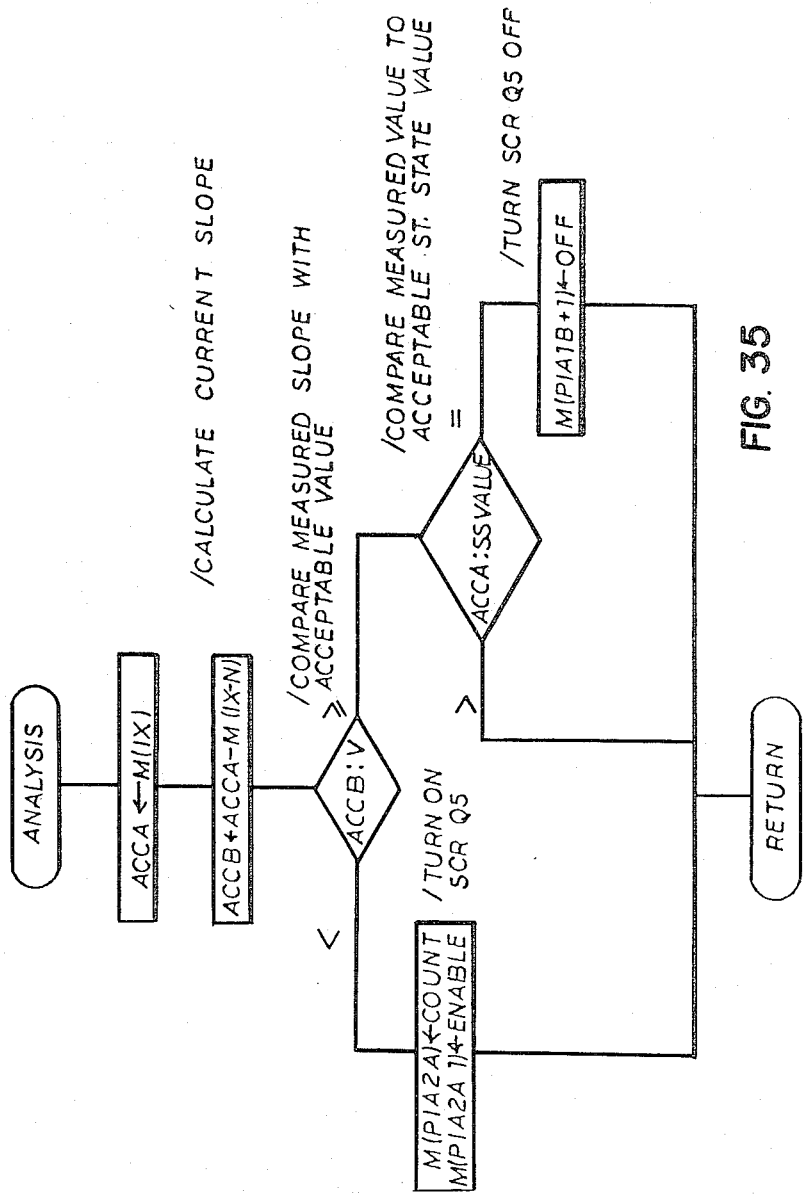

FIG. 29 shows a circuit for interfacing to a teletypewriter TTY by way of an RS-232 interface 61. Signals from the interface 61 are transmitted by way of a 4N33 opto-osolator T30 and an inverter T31A to the ACIA circuit shown in FIG. 19.

The interface 61 is bidirectional and is shown in FIG. 3 as comprising a transistor 62 to pass received data to an optional printer in the teletypewriter and a tranistor 63 that may also be connected by a switch $S_1$ to pass signals from the teletypewriter keyboard to the printer for full duplex operation. Information from the keyboard is always transmitted through the circuit 61 to the ACIA. The teletypewriter is an optional item which can be used for maintenance of the equipment.

In order to describe the control of the SCR chopper 34 in FIGS. 4, 5 and 10 properly, reference will be made to FIGS. 19–28 describing the microcomputer and particularly to the circuits in FIGS. 19, 20, 23, 25 and 26 as well as the sensor in FIG. 4.

At appropriate times the microprocessor M6800 transmits signals via the adapter PIA 2 to the SCR chopper 34 to turn on and off at times to produce a width-modulated pulse waveform. The one-shorts T6B, T8A, and T9A provide gate pulses to the gate drivers.

Turning on the main SCR $Q_5$ consists of the following steps:

1. When the output voltage of op-amp T29A goes to zero, the comparator T29 flips from 0 to +5 volts. This means that the chopper 34 has been turned off. When this occurs, the gate T7C is enabled and the combined counter T18, T19 can count clock CLK2 pulses.

2. The microprocessor M6800 outputs a count value via the adapter PIA 2A to the counters T18 and T19. When that count value is reached, an overflow occurs and the one-shot T9A generates a pulse to turn on the SCR $Q_5$.

What is claimed is:

1. An arc cutting, gouging and welding power supply system comprising:
    a direct current power supply;
    welding electrodes;
    a supply circuit connecting said supply to said electrodes to convey welding current to the electrodes to form an arc;
    a sensing circuit connected to the supply circuit to sense arc-producing parameters and changes in those parameters which are indicative of a pending arc extinction;
    storage means to store parameter change information corresponding to sufficient change in the arc-producing parameters to indicate pending extinction of the arc and a resulting production of audible noise impulses;
    comparison means connected to said sensing circuit and to said storage means to compare changes in the sensed arc-producing parameters with stored information of noise-producing changes;
    maintenance means to maintain the arc; and
    means responsive to the comparison means and connected to the maintenance means to actuate the maintenance means when the rate of change of the sensed parameter is greater than the rate of change of the stored noise-producing changes.

2. The invention, as defined in claim 1, in which the maintenance means comprises means to control in substantially less than 20 milliseconds the voltage applied to the electrodes to maintain the arc and a silicon controlled rectifier chopper circuit connected in series between the power supply and the electrodes, said power supply system including an air-carbon arc arrangement for providing an arc with and air stream to cut or gauge metals.

3. The invention as defined in claim 2 in which the chopper circuit comprises:
    a main silicon controlled rectifier connected in series with the power supply and the electrodes;
    a capacitor capable of storing a predetermined amount of charge; and
    switching circuit means to connect the capacitor to a charging source and into connection with the main silicon controlled rectifier to reverse the apparent polarity of voltage supplied to the main silicon controlled rectifier for at least a long time enough to permit the silicon controlled rectifier to become non-conductive.

4. The invention as defined in claim 3 in which the switching circuit comprises:
- a bridge circuit comprising four additional silicon controlled rectifiers connected in conductive polarity across positive and negative terminals of the power supply; and
- means to gate selected opposite pairs of the additional silicon controlled rectifiers to be conductive to connect the charged capacitor across said output terminals in the proper polarity to reverse, temporarily, the voltage applied across the main silicon controlled rectifier.

5. The invention as defined in claim 4 comprising, in addition:
- a transformer having a first winding in series between the power supply and the main silicon controlled rectifier:
- a second winding; and
- a diode connected in series with the second winding and the power supply and polarized to be conductive only when the voltage across the second winding is at least as great as the power supply voltage and of opposite polarity.

6. The invention as defined in claim 1 in which the sensing circuit is a voltage sensing circuit.

7. The invention as defined in claim 1 in which the sensing circuit comprises current sensing means connected in series between the power supply and the electrodes.

8. The invention as defined in claim 1 in which the maintenance means comprises a source of radio frequency energy connected to the welding electrodes.

9. An arc welding power supply sustem comprising:
- a direct current power supply;
- welding electrodes;
- a supply circuit connecting said supply to said electrodes to convey welding current to the electrodes;
- a sensing circuit connected to the supply circuit to sense arc-producing parameters and changes in those parameters;
- storage means to store parameter change information corresponding to sufficient change in the arc-producing parameters to produce audible noise impulses;
- comparison means connected to said sensing circuit and to said storage means to compare changes in the sensed arc-producing parameters with stored information of noise-producing changes;
- maintenance means to maintain the arc; and
- means responsive to the comparison means and connected to the maintenance means to actuate the maintenance means when the rate of change of the sensed parameter is greater than the rate of change of the stored noise-producing changes;
- a source of oscillation having a frequency much higher than the rate of change of arc current in the initial part of an arc quench;
- a clock rate controller connected to the source to receive the oscillations for the source, the storage and comparison means comprising a microprocessor;
- first connection means connecting the microprocessor to the clock rate controller;
- a read-only memory;
- second connection means connecting the clock rate controller to the memory;
- third connection means connecting the microprocessor to the memory;
- a digital-to-analog converter connected to the memory to be actuated by controlled signals from the memory; and
- amplifier means connected in sequence between the converter and the welding electrodes to apply controlled radio frequency power signals to the electrodes.

10. A method of reducing impulse noise to a sudden short period diminution in electric arc current which accompanies extinction of an arc, the method comprising the steps of:
- detecting change in power parameters applied to produce an arc which are indicative of a pending arc extinction;
- comparing such change with a specific recorded change values of such parameters known to be capable of producing an impulse noise and indicative of a pending arc extinction; and
- increasing arc-sustaining parameters if the comparison establishes that the detected change is at a greater rate than the specific recorded change.

11. The invention as defined in claim 10 in which the arc-sustaining parameters include voltage applied to maintain the arc.

12. The invention as defined in claim 10 in which the arc-sustaining parameters include electromagnetic ionizing energy supplied to the arc.

13. The invention in claim 10 in which the detection of change comprises detection of arc current.

14. The invention in claim 10 in which the detection of change comprises detection of arc voltage.

15. The invention, in claim 10, including increasing arc-suspending parameters to a level only to lengthen the short period of the diminution in electric arc current to reduce the impulse noise.

* * * * *

UNITED STATES PATENT AND TRADEMARK OFFICE
CERTIFICATE OF CORRECTION

PATENT NO. : 4,320,282

DATED : March 16, 1982

INVENTOR(S) : John F. McDonald et al

It is certified that error appears in the above-identified patent and that said Letters Patent is hereby corrected as shown below:

On the title page, Item (54) should read:

-- Microprocessor Based Air-Carbon-Arc Cutting, Gauging And Welding Noise Abatement Controller --.

Signed and Sealed this

First Day of March 1983

[SEAL]

Attest:

GERALD J. MOSSINGHOFF

Attesting Officer

Commissioner of Patents and Trademarks